(12) United States Patent
Kitada

(10) Patent No.: US 7,458,514 B1
(45) Date of Patent: Dec. 2, 2008

(54) INFORMATION PROCESSING SYSTEM, HAND HELD CELLULAR PHONE, AND INFORMATION PROCESSING METHOD

(75) Inventor: Takaharu Kitada, Tokyo (JP)

(73) Assignee: Sony Corporation (JP)

(*) Notice: Subject to any disclaimer, the term of this patent is extended or adjusted under 35 U.S.C. 154(b) by 1870 days.

(21) Appl. No.: 09/665,667

(22) Filed: Sep. 20, 2000

(30) Foreign Application Priority Data

Sep. 22, 1999 (JP) ............................ 11-268927

(51) Int. Cl.
*G06K 7/10* (2006.01)
(52) U.S. Cl. ....................... 235/472.01; 235/462.45
(58) Field of Classification Search ............... 235/483, 235/462.45, 462.46, 472.01, 472.02, 454, 235/385, 305, 383; 340/540, 572.1, 572.8
See application file for complete search history.

(56) References Cited

U.S. PATENT DOCUMENTS

| | | | |
|---|---|---|---|
| 4,780,599 A | 10/1988 | Baus | |
| 5,382,784 A * | 1/1995 | Eberhardt | 235/462.46 |
| 5,586,050 A * | 12/1996 | Makel et al. | 702/51 |
| 5,739,518 A * | 4/1998 | Wang | 235/462.09 |
| 5,898,370 A * | 4/1999 | Reymond | 340/540 |
| 5,939,695 A | 8/1999 | Nelson | |
| 5,959,531 A * | 9/1999 | Gallagher et al. | 235/375 |
| 6,012,641 A * | 1/2000 | Watada | 455/556 |
| 6,025,780 A * | 2/2000 | Bowers et al. | 235/472.01 |
| 6,085,112 A * | 7/2000 | Kleinschmidt et al. | 455/406 |
| 6,089,456 A * | 7/2000 | Walsh et al. | 340/531 |
| 6,193,160 B1 * | 2/2001 | Zembitski | 235/472.01 |
| 6,345,764 B1 * | 2/2002 | Knowles | 340/825.49 |
| 6,415,978 B1 * | 7/2002 | McAllister | 235/462.01 |
| 2002/0006786 A1 * | 1/2002 | Mine | |

FOREIGN PATENT DOCUMENTS

| | | |
|---|---|---|
| DE | 40 23 632 | 7/1990 |
| DE | 42 28 692 A | 1/1993 |
| EP | 0 446 500 A1 | 9/1991 |
| EP | 0 645 728 A2 | 3/1995 |
| EP | 0 837 406 | 4/1998 |
| EP | 0 856 812 | 8/1998 |
| GB | 2 300 286 A | 10/1996 |
| WO | WO 98/25212 | 6/1998 |
| WO | WO 99/04364 | 1/1999 |
| WO | WO 99 17230 A | 4/1999 |

OTHER PUBLICATIONS

EPO Search Report dated Oct. 30, 2003.
Singapore Search Report and Examination Report Feb. 17, 2003.

* cited by examiner

*Primary Examiner*—Daniel St.Cyr
(74) *Attorney, Agent, or Firm*—Rader Fishman & Grauer PLLC; Ronald P. Kananen

(57) ABSTRACT

An information processing system comprises an information providing medium that stores information in an electromagnetic or optical manner, the information providing medium being attached to an entity in order to provide information associated with the entity; a hand held terminal device having an information read function that reads information from the information providing medium in an electromagnetic or optical manner and record the information; and an information processing unit for retrieving the information recorded in the hand held terminal device; wherein the information providing medium is inconspicuously attached to the entity. In this manner, the information can be recorded into the hand held terminal for later use by a user.

34 Claims, 25 Drawing Sheets

F I G. 3
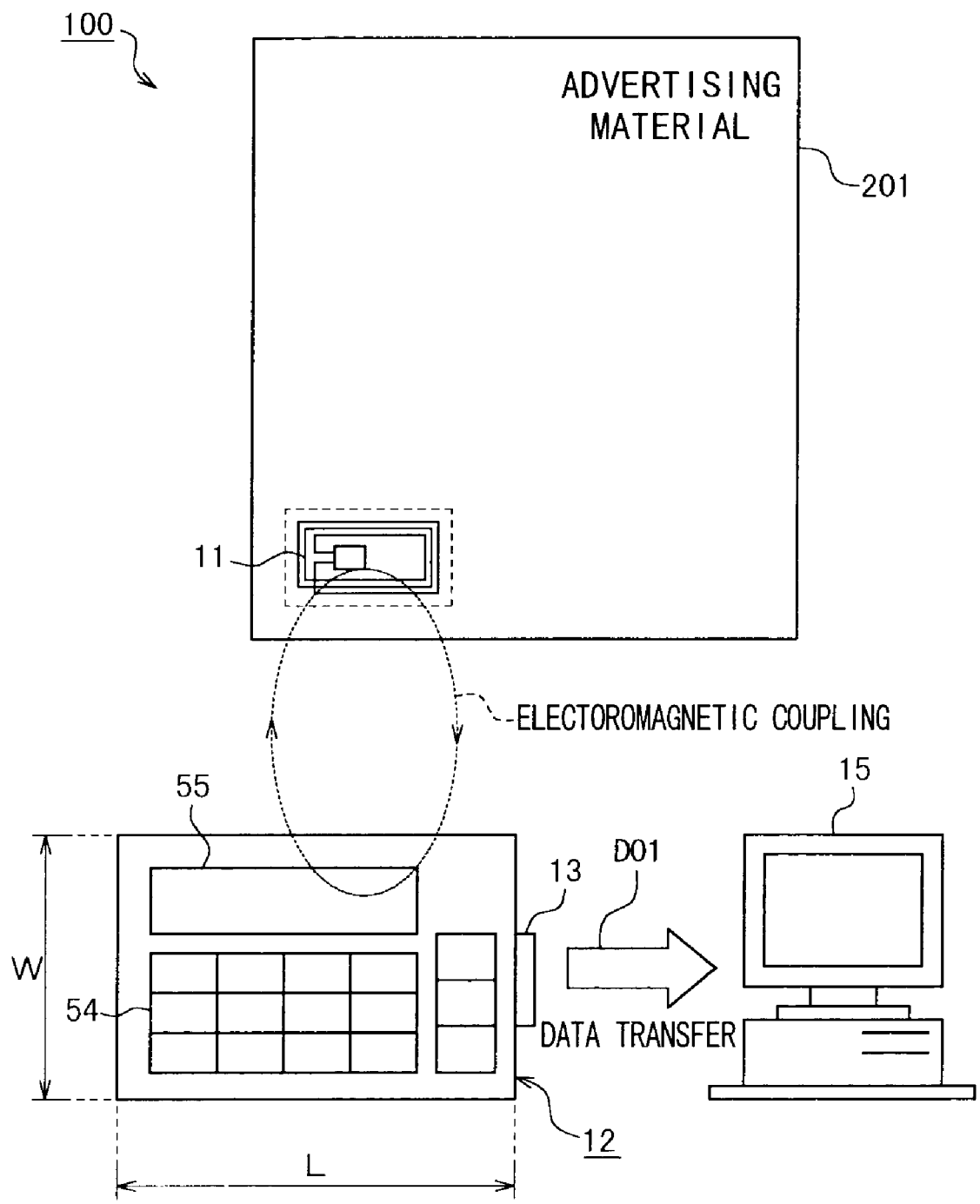

F I G. 1 7
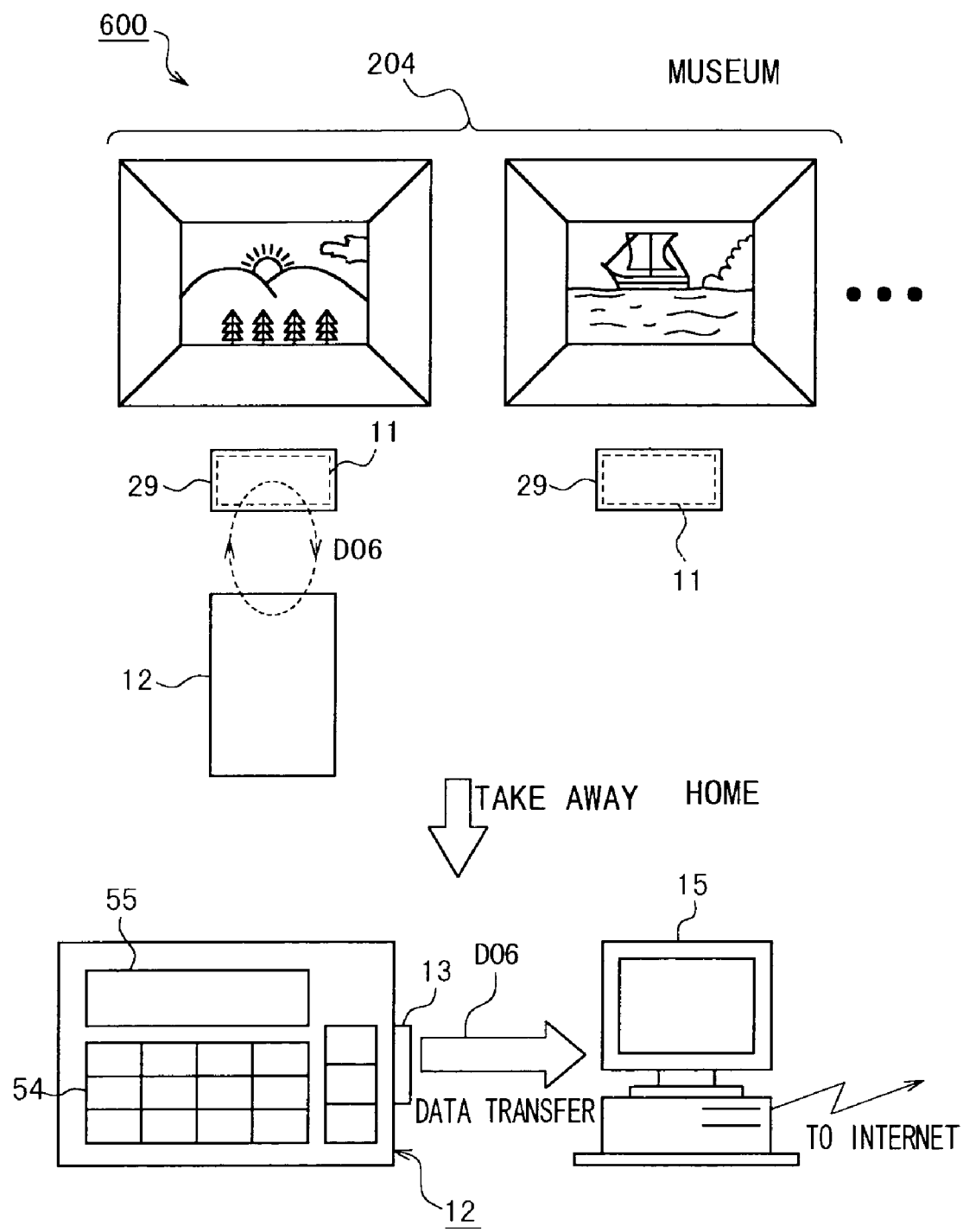

INFORMATION PROCESSING SYSTEM, HAND HELD CELLULAR PHONE, AND INFORMATION PROCESSING METHOD

BACKGROUND OF THE INVENTION

1. Field of the Invention

The present invention relates to an information processing system, a hand held cellular phone, and an information processing method preferably applied to an electronic advertising system, a commodity selling system, a commodity information providing system, a food information providing system, a recording medium information providing system, a commodity genuineness or counterfeit discriminating system or the like.

In detail, an information providing medium is attached to an entity (article or material) such as commodity or advertising material, and a hand held terminal device with its information read function is provided so as to be possessed by each of the individual information users. In the case where the information user attempts to obtain information associated with its entity, the information can be electrically stored in a hand held terminal device momentously, and the information can be read from the hand held terminal device to the information processing unit, whereby the information associated with its entity can be processed by the information processing unit.

2. Description of the Related Art

Conventionally, it is often that posters such as resort guide, employment guide, or event guide are presented at station concourse, and suspension advertisements of these guides are presented in train. In the case where one attempts to obtain a contact of an advertisement material of interest by seeing these posters or suspension advertisements, it is generally often that one learns the information by heart or writes it by paper and pen or pencil. In this case, if a large amount of information is provided, it takes long to write the information.

In the meantime, according to an information processing method of a conventional system, in the case where one can look at an advertising material carefully, for example, in the case where one sees an advertising material of interest at station concourse on the way of commutation, it is generally often that one must write the information such as address or contact associated with that advertising material by using pen or pencil, and such writing is very cumbersome. In particular, an E-mail address prepared to provide direct access to companies associated with that advertising material contains 30 to 50 characters or signs, thus making it difficult to precisely learn them by heart once. When the written memorandum is lost, there is a problem that one must rewrite the same information from its advertising material (hereinafter, referred to as "entity") after one has dropped there.

In addition, when there occurs a case where so called brand commodities such as handbag, bag, or shoes is discriminated from counterfeit, it is discriminated by its sewing manner or buttons as whether the commodities are genuineness or counterfeit. However, a very high skill is required for such discrimination. Therefore, if no countermeasure is taken in advanced information processing technology, there is a problem that the damages of genuine commodity manufacturers is remarkably high.

SUMMARY OF THE INVENTION

The present invention has been made in order to solve such conventional problems. It is an object of the present invention to provide an information processing system, a hand held cellular phone, and an information processing method for, in the case where an information user attempts to obtain information associated with an entity such as commodities or advertising materials, making it possible to electrically record the information momentously and then, making it possible to process the information.

In order to solve the aforementioned problems, there is provided an information processing system comprising: an information providing medium capable of reading information in an electromagnetic or optical manner, the information providing medium being attached to an entity in order to provide information associated with the entity; an hand held terminal device with its information read function for reading information in an electromagnetic or optical manner from this information providing medium and recording the information therein; and an information processing unit for reading the information recorded in the hand held terminal device and processing the information.

An information processing system according to the present invention is characterized in that an information capable of reading information in an electromagnetic or optical manner is attached to an entity such as commodities or advertising materials by the information provider. The information user uses a hand held terminal device with its information read function as required, wherein information is read from the information providing medium in an electromagnetic or optical manner, and is recorded. Then, the information read from the hand held terminal device is processed by an information processing unit to be converted into information of audible type, for example.

Therefore, in the case where one cannot look at an entity such as commodities or advertising materials carefully, for example, in the case where one sees an advertisement at station concourse on the way of commutation, information such as address or contact associated with its entity can be electronically stored momentously in a hand held terminal device even if the information is not written by pen or pencil. Thus, the information associated with the entity read at home from the hand held terminal device to an information processing unit, one can look at the information by using the information processing unit or can provide direct access to the company through Internet. The information processing system can be fully applied to an electronic advertising system, a commodity selling system, a commodity information providing system, a food information providing system, a recording medium information providing system, an exhibition information providing system, a commodity genuineness or counterfeit discriminating system or the like.

A hand held cellular phone according to the present invention is directed to a cellular phone for reading information from an information providing medium attached to an entity and processing the information, the hand held cellular phone comprising: a telephone function; information read means for reading information associated with the entity from the information providing medium; and non-volatile storage means for storing the information read from the information read means.

A hand held cellular phone according to the present invention is characterized in that, in the case where information is read from an information providing medium attached to an entity, and is processed, for example, the hand held cellular phone is made close to the information providing medium, whereby an antenna body is coupled with the information providing medium in an electromagnetic manner. The information associated with the entity from this antenna body is read from the information read means, and this information is stored in non-volatile storage means.

Therefore, the information associated with the entity read from storage means can always be processed by utilizing a telephone function.

An information processing method according to the present invention is characterized in that an information providing medium capable of reading information in an electromagnetic or optical manner is, the attached to an article or material information providing medium providing information associated with the article or material; the information is read in an electromagnetic or optical manner from the information providing medium; and then, the recorded information is read and processed.

The information processing method according to the present invention is characterized in that, in the case where an information user attempts to obtain information associated with the entity, the information can be read momentously in an electromagnetic or optical manner. Moreover, the information associated with the entity can be utilized any time even if the information is written by pen or pencil.

BRIEF DESCRIPTION OF THE DRAWINGS

For a better understanding of the present invention, reference is made to the following detailed description of the invention, taken in conjunction with the following drawings in which:

FIG. 3 is an imaginary view showing an example of configuring an electronic advertising system 100 according to a first embodiment;

FIG. 17 is an imaginary view showing an example of configuring an exhibition information providing system 600 according to a sixth embodiment;

DESCRIPTION OF PREFERRED EMBODIMENTS

One embodiment of an information processing system, a hand held cellular phone, and an information processing method according to the present invention will be described with reference to the accompanying drawings.

(1) Preferred Embodiments

Figure 1:
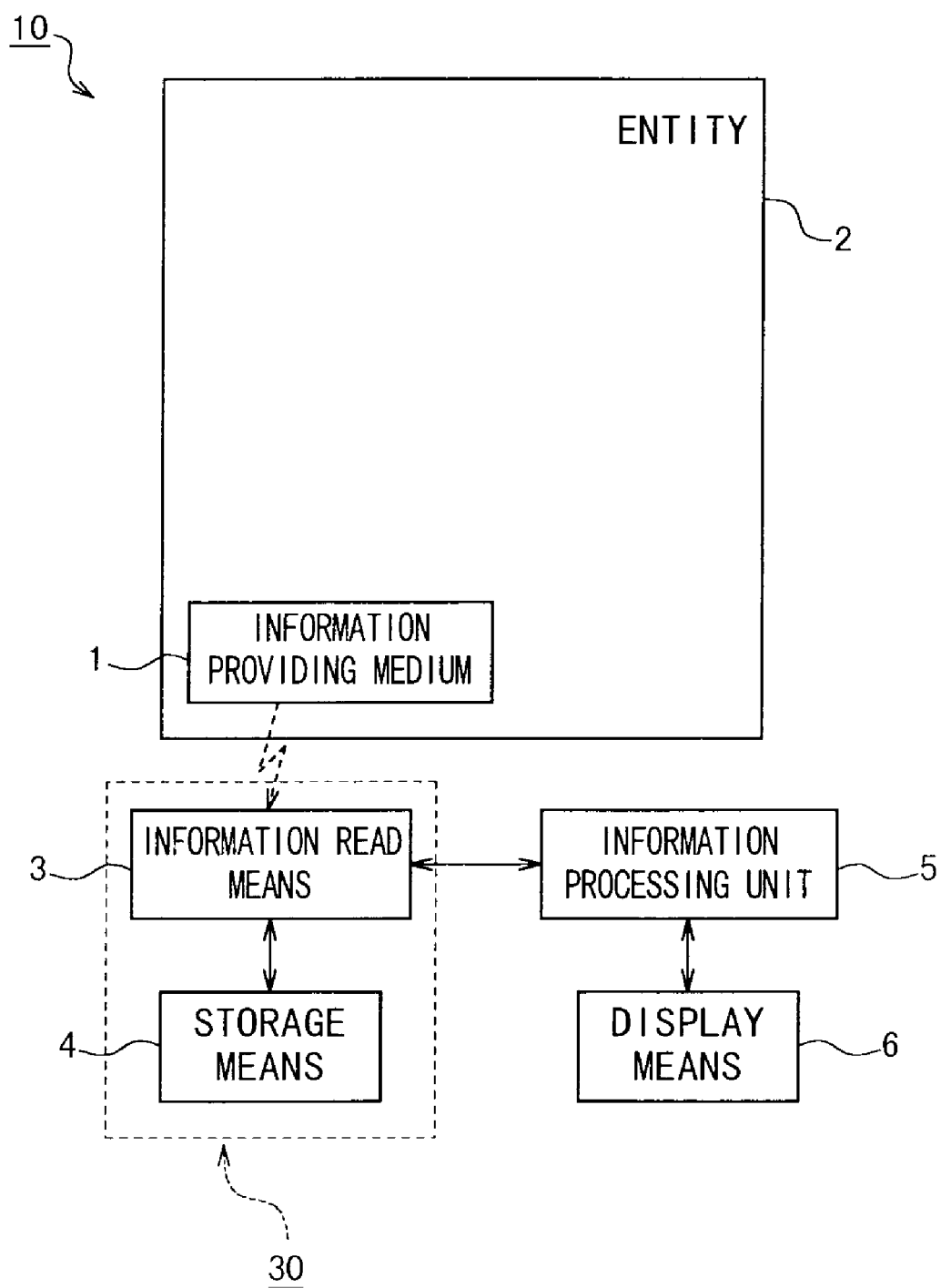
FIG. 1 is a block diagram depicting an example of configuring an information processing system 10 according to a preferred embodiment.

FIG. 1 is a block diagram depicting an example of configuring an information processing system 10 according to one preferred embodiment.

In this embodiment, an information providing medium is attached to an arbitrary entity such as commodity or advertising material, a hand held terminal devices is provided so as to be possessed individually by each of the information users. In the case where the information user attempts to obtain information associated with the entity, the information can be electronically stored in the hand held terminal device momentously, and the information can be read from the hand held terminal device to the information processing unit, whereby the information associated with the entity can be processed by the information processing unit.

In an information processing system 10 shown in FIG. 1, an information providing medium 1 capable of reading information is provided in advance in an electromagnetic or optical manner. For the information providing medium 1, there is used a recording medium for providing the electronic information content; a recording medium for providing the magnetic information content; or a recording medium for providing the optical information content. The information providing medium 1 is attached to an arbitrary entity 2 such as commodity, food, recording medium, exhibition, or advertising material by the information provider.

For example, the information provider can mount the information providing medium 1 to each of the commodities displayed at shop or in online commodity exhibition site; mount the information providing medium 1 to each of the foods arranged at a food shop; mount the information providing medium 1 to each of the recording media displayed at record shop; mount the information providing medium 1 to each of the materials exhibited at museum or art gallery; or mount the information providing medium 1 to each of the arbitrary advertising materials attached at station concourse, in train, at cinema, on street board or the like. In this manner, the information associated with an entity 2 such as commodity, food, recording medium, exhibited material, advertising material or the like is provided to a user.

In this example, the information providing medium 1 is attached to the top surface or bottom surface of the entity 2 or a specific location in an object. Of course, the information providing medium 1 may be attached to a package or storage material of the entity 2 or may be provided as an accessory in the form of card. In order to emphasize the mount location (presence) of the information providing medium 1, an indication indicative of the presence of the medium is given on the top surface of the entity 2. In a method for mounting the information providing medium 1, for example, in the case where the entity 2 is an advertising material, a pocket or the like is provided at its top surface or bottom surface so as to store the information providing medium 1 in the pocket. After the information providing medium 1 has been stored, the pocket may be sealed to prevent it from being stolen.

In addition, in the case where this system is used to discriminate whether the entity 2 is genuine or counterfeit, for example, in import or export materials, the form in which the information providing medium 1 is embedded in the object. This is because, in the case where it is required to discriminate genuineness from counterfeit, only an authorized checker or a specific information user can grasp its mount location.

As the contents of records into this information providing medium 1, the information associated with the entity 2 is stored in the form of data. For example, in the case where the entity 2 is a commodity such as electric equipment, cloth, cosmetic, luggage, bag, or shoes, there are recorded in the information providing medium 1 the information on commodity features, functions, specification, price which cannot be entered in a conventional tag or the information on contact. In the case where the entity 2 is a food, there are recorded in the information providing medium 1 the information on the food price, life, recipe, calorie, information on wines suitable to the food, the origin or information on contact. Of course, the information providing medium 1 may record these items of character information, text information, or voice and video information.

In the case where the entity is a recording medium such as compact disk (CD) or digital versatile disc (DVD), there are recorded in the information providing medium 1 the audio information on introductory portion of the CD associated with the recording medium or voice and video information on the cinema introduction portion of the DVD in order to expand commodity selling. In the case where the entity 2 is an exhibited material such as picture or photograph, there are recorded in the information providing medium 1 the information on picture guidance, the information on photographic conditions, audio information on artist or model or the like. In the case where the entity 2 is an advertising material associated with exhibition, there is recorded in the information providing medium 1 the information on date and time, place, admission, traffic, contact or the like. In recent years, there has been displayed an E-mail address for accessing an information provider through Internet as well as telephone number of contact. Of course, this E-mail address is also recorded in the information providing medium.

The information providing medium 1 has a film shaped substrate, for example. At this substrate, an IC chip and an antenna body connected to this IC chip are provided so as to store information associated with the entity 2. The information providing medium 1 may be a monochrome barcode, a two dimensional code, or a magnetic information sheet without being limited to the IC chip and antenna body. It is sufficient if the information associated with the entity 2 can be stored, and these items of information can be provided to an information user.

In this information processing system 10, a hand held cellular terminal device 30 with its electromagnetic or optical information read function is used. Information is read in an electromagnetic or optical manner from at least the information providing medium 1, and is recorded in the form of data. This hand held terminal device 30 is provided so as to be possessed individually by each of the information users.

An electromagnetic hand held terminal device 30 has at least an antenna body and information read means 3. This terminal device is coupled with an antenna body of the information providing medium 1 in an electromagnetic manner so that information associated with the entity 2 is read from this antenna body by information read means 3. Non-volatile storage means 4 is connected to this information read means 3 so as to store the information read by the information read means 3.

An hand held terminal device with its optical information read function has an optical sensor (not shown) so as to read at least a monochrome bar code or two dimensional code provided at the information providing medium 1. Non-volatile storage means is connected to an optical sensor, and the information associated with the entity 2 fetched from the optical sensor is stored.

A magnetic hand held terminal device has a magnetic sensor (not shown) so as to read at least a magnetic information sheet provided at the information providing medium 1. Non-volatile storage means is connected to the magnetic sensor so as to store the information associated with the entity 2 fetched from the magnetic sensor. The storage means 4 may be incorporated in a hand held terminal device 30 (internal type) or may be mounted to the hand held terminal device 30 (external type). A flash memory such as EEPROM is used for storage medium 4.

In this example, the hand held terminal device 30 is made close to the information providing medium 1 or the hand held terminal device 30 is scanned on the information providing medium 1, whereby information is read from the information providing medium 1 in an electromagnetic or optical manner (hereinafter, referred to as an electronic memo function). In addition, the hand held terminal device 30 may be a hand held cellular phone having its information read function without being limited to its specific terminal device for reading information from the information providing medium 1.

This hand held terminal device 30 is generally used by being connected to an information processing unit 5 so that the information recorded in the form of data is processed to be converted into information of audible type. The information processing unit 5 is provided so that the genuineness or counterfeit of the information read from the hand held terminal device 30 may be discriminated. In this embodiment, in the case where a configuration is adopted such that the hand held terminal device 30 incorporates the information processing unit 5, the information processing unit 5 is embodied by a central processing unit (CPU) in a narrow sense.

Display means 6 is connected to this information processing unit 5, a liquid crystal display element with about some tens×some hundreds of pixels or a flat display element and the like is used as this display means 5. Information processed in an audible form is displayed intact on the hand held terminal device 30 so that the content can be seen carefully.

In the case this hand held terminal device 30 is equipped with the aforementioned display function, the information processing unit 5 is embodied by a desktop type personal computer (hereinafter, referred to as a personal computer) or hand held notebook type personal computer in a broad sense, and the information that cannot be processed by the hand held terminal device 30 is processed to be converted into information of audible type. Depending on the industry type to which the information processing system 10 is applied, the information processing unit 5 may be an information processing unit with its money registry function provided at a shop.

As display means 6, there is used some inches of a cathode ray tube (CRT) with which the aforementioned personal computer is provided or a liquid crystal panel of a some hundreds× some hundreds of pixels, and the information processed in an audible form is displayed intact. In addition, the information processing unit 5 extracts an E-mail address of the information provider obtained from the information read from the hand held terminal device 30. Internet is connected to the information provider, whereby information processing such as collecting more detailed information from the information provider is performed.

Now, an information processing method according to the present embodiment will be described with reference to an example of information processing in the information processing system 10.

This embodiment assumes that information such as commodity or advertising material associated with the entity 2 is stored in advance in the information providing medium 1. An information user is assumed to possess a hand held terminal device 30 with its electromagnetic, optical or magnetic information read function. In addition, there is shown an example when a personal computer provided at home or the like is used for an information processing unit 5. In the case where the information processing system 10 is applied to a commodity selling system or the like, an information processing unit with its money registry function provided at shop is used.

Figure 2:
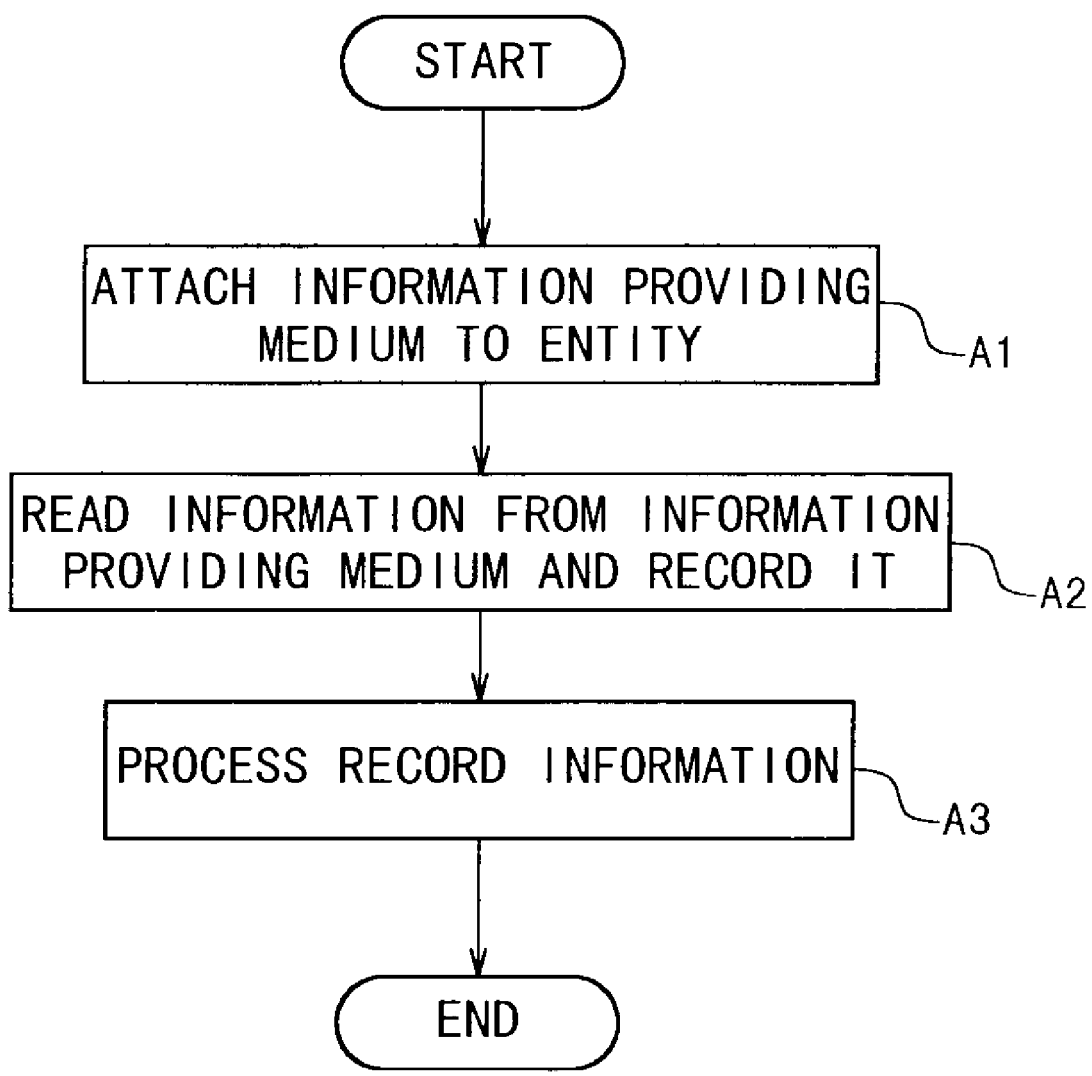
FIG. 2 is a flow chart illustrating a example of processing in the information processing system 10 according to a preferred embodiment.

With this being presumed, at step A1 of the flow chart shown in FIG. 2, an electromagnetically or optically information readable information providing medium 1 is attached to an arbitrary entity 2 by the information provider. The information providing medium 1 is attached to an arbitrary entity 2 such as commodity, food, recording medium, exhibited material, or advertising material by the information provider depending on industry type.

For example, information such as commodity features, functions, specification, or price that cannot be entered into a conventional tag or information such as contact is recorded in the information providing medium 1. This commodity with its information providing medium is displayed intact in a show case at shop or online commodity exhibition site, for example.

At a food shop, information such as food price, life, recipe, calorie, information on wines suitable to the food or the origin or information on contact is recorded in the information providing medium 1. These foods each having the information providing medium is arranged at a food shop, for example. At a CD or DVD shop, audio information on the introductory portion of a music associated with the recording medium or voice and video information at the introductory portion of a cinema is recorded in the information providing medium 1. The recording media each with the information providing medium are displayed at record shop.

At museum or art gallery, there are recorded in the information providing medium 1 the information on picture guidance, the information on photographic conditions, or the audio information on artists or models concerning exhibited materials. This information providing medium 1 is displayed intact near a works such as picture or photograph, for example. In addition, in the case of advertisement type, there is recorded in the information providing medium 1 the information such as (late and time, place, admission, traffic, or contact described on the surface of an advertising material associated with an event. The advertisement material including this information providing medium is presented at station concourse, in train, at cinema, on street bulletin board or the like.

This is because information on the entity 2 such as these commodities, foods, recording media, exhibited materials, advertising material is provided to a user. Depending on industry type, the information providing medium 1 is attached on the top surface or bottom surface of the entity 2 or at a specific position in an object. Of course, the information providing medium 1 may be attached to the package or storage material of the entity 2 or may be provided as an accessory of the entity 2. In order to emphasize the mount location (presence) of the information providing medium 1, an indication indicative of the presence of the medium is given on the top surface of the entity 2. In a method for mounting the information providing medium 1, for example, in the case where the entity 2 is an advertising material, a pocket or the like is provided on its top surface or bottom surface so as to store the information providing medium 1 in this pocket. After the information providing medium 1 has been stored, the pocket may be sealed to prevent it from being stolen. The information providing medium 1 may be embedded in the entity such as import or export material.

Thereafter, at step A2, by the information user, information is read from the information providing medium 1 in an electromagnetic or optical manner, and is recorded therein by using a hand held terminal device 30 with its information read function as required by referring to: commodities with information providing media displayed in a show case such as shop or online commodity exhibition site; foods with information providing media arranged at a food shop; recording media with information providing media displayed at record shop; exhibited materials with information providing media presented near works such as pictures or photographs; advertising materials with information providing media presented at station concourse, in train, at cinema, or on street bulletin board.

At step A3, information read from the hand held terminal device 30 is processed. For example, in the case where the information processing system 10 is applied to a commodity selling system, commodity information read from the information providing medium 1 according to a desired commodity is merely transferred to an information processing unit 5 that serves as a fare adjustment site at that shop without bringing the commodity for a cash register so as to calculate a total amount of purchase or the like.

In the case of Internet commodity selling, information on cloth color, size, material is applied free in an online commodity exhibition site. Thus, the information user brings the hand held terminal device 30 back home, these items of information are transferred to a personal computer at home or the like, and the information is processed by the personal computer to be converted into information of audible type. In this manner, the information such as commodity features, functions, specification, or price that cannot be entered into a conventional tag can be obtained.

The information providing medium 1 added to a food is obtained together with that food. Thus, by using the hand held terminal device 30 at home, there is read from the information providing medium 1 to the information processing device 5 or the like the information such as food life, recipe, calorie, information on wines suitable to the food, the origin, or information on contact. A food can be processed based on the information.

The information associated with recording media read at a shop selling CDs or DVDs is transferred from the hand held terminal device 30 to the information processing unit 5. Then, the audio information on the introductory portion of the CD according to a new release or voice or video information on the introductory portion of a cinema of the DVD is produced by the information processing unit 5. In this manner, the information user can easily establish a plan for purchasing recording media.

At museum or art gallery, one can listen immediately to picture guidance information associated with its exhibited materials read from the information providing medium 1 to the hand held terminal device 30, information on photographic conditions, or voice information on artists or models. Of course, one may bring the hand held terminal device 30 back home, transfer information to a personal computer at home and process the information to be converted into information of audible type.

Information associated with an event read from an advertising material with an information providing medium presented at station concourse, in train, at cinema, or on street bulletin board is transferred from the hand held terminal device 30 to the information processing unit 5. Then, information such as date and time, place, admission, traffic, contact is reproduced by the information processing unit 5.

When it is required to discriminate genuineness from counterfeit, the information is read from the information providing medium 1 by an authorized checker or specific information user, and the genuineness or counterfeit of the entity 2 is discriminated.

In this manner, there is provided an information processing system 10 embodied according to the present invention, wherein the information providing medium 1 capable of reading information in an electromagnetic or optical manner is attached by the information provider to an arbitrary entity 2 such as commodity or advertising material. The information user uses a hand held terminal 30 with its information read function as required, wherein information is read from the information providing medium 1 in an electromagnetic or optical manner, and is recorded. Thereafter, the information read from the hand held terminal device 30 is processed by the information processing unit 5 to be converted into information of audible type, for example.

Therefore, in the case where one cannot look at an entity such as commodity or advertising material carefully, for example, in the case where one sees such entity at station concourse on the way of commutation, one can store information such as address or contact associated with the entity 2 momentously in the hand held terminal device without writing the information by pen or pencil. Thus, one can read the information associated with the entity from the hand held terminal device 30 to the information processing unit 5, see the information associated with entity 2 by using the information processing unit 5, and provide a direct access to the company through Internet. The information processing system 10 can be fully applied to an electronic advertising system, a commodity selling system, a commodity information providing system, a food information providing system, a recording medium information providing system, an exhibition information providing system, a commodity genuineness or counterfeit discriminating system or the like.

(2) First Embodiment

FIG. 3 is an imaginary view showing an example of configuring an electronic advertising system 100 according to a first embodiment. This electronic advertising system 100 applies to an arbitrary advertising material 201 concerning an entity 2 so as to provide the contents of electronic information associated with this advertising material 201 to an information user. Information providing electronic parts 11 modulated in advance are attached to this advertising material 201. Information associated with the advertising material 201 is read from this information providing electronic part 11 in an electromagnetic manner by using a hand held information reading display 12. Then, the information recorded in the form of data is processed by a personal computer 15 to be converted into information of audible type.

In the electronic advertising system 100 shown in FIG. 3, the information providing electronic parts 11 are attached in advance as an information providing medium 1 capable of reading information in an electromagnetic manner. A description of the information providing electronic parts 11 will be given with reference to FIG. 4 by way of example. The information providing electronic parts 11 are attached to an arbitrary advertising material 201 presented by an information provider, for example, at station concourse, in train, at cinema, on street bulletin board or the like.

In this example, the information providing parts 11 are attached so as to be stored in a pocket provided at the left diagonal lower part of the top surface of the advertising material 201. After the information electronic parts 11 have been stored, the pocket is sealed to prevent it from being stolen. In order to emphasize its mount location, an outstanding red-colored frame is given so as to surround the periphery of the mount place.

As the contents of records into the information providing electronic parts 11, for example, in the case of an advertisement of a newly opened amusement park provided with a new roller coaster, a photograph of the entire roller coaster is presented on the top surface of the advertising material 201. At the lower part of the material, the start date and time, place, admission, traffic, contact or the like is described, and the advertising information D01 identical to the above content is recorded in the information providing electronic parts 11. Of course, an E-mail address as well as telephone number is recorded in the information providing electronic parts 11 for an information user who attempts to obtain more detailed advertising information D01 concerning such new roller coaster.

In this electronic advertising system 100, a hand held information reading display 12 is used as a hand held terminal device 30. This information reading display 12 is what is called card size of about 80 mm to 100 mm in horizontal length L shown in FIG. 3, about 50 mm to 60 mm in vertical length W, and about 5 mm to 10 mm in thickness, for example. In this example, the information reading display 12 and the information providing electronic parts 11 are coupled with each other in an at least electromagnetic manner, the advertising information D01 is read from the information providing electronic parts 11 in an electromagnetic manner so as to be recorded in the form of data.

This information reading display 12 is provided to be possessed individually by each of the information users. In a method for handing the above information reading display 12, the information reading display 12 is made close to the information providing electronic parts 11, and these display and parts are superimposed with each other, whereby the advertising information D01 is read from the information providing electronic parts 11 in an electromagnetic manner. In this information reading display 12, a flash memory such as EEPROM is incorporated or is externally provided as non-volatile storage means, and the advertising information D01 arbitrarily read from the information providing electronic parts 11 is recorded in the memory.

In this example, the advertising information D01 read from the information providing electronic parts 11 is processed by the information reading display 12 to be converted into information of audible type. The information is displayed intact on a liquid crystal display element of the information display 12 so that the content can be seen immediately. In addition, a universal serial bus (hereinafter referred to as USB) terminal 13 is provided at the information reading display 12 so as to enable collection to a personal computer 15 by using a USB terminal 13 or a communication cable according to the RS23C communication protocols. The information that cannot be processed by the information reading display 12 is provided for communication processing. Of course, the information processed into audible type may be displayed by a CRT with which a personal computer is provided. In addition, an E-mail address of the information provider is extracted from the information, and connection to the information provider is made via Internet by using the personal computer 15. In this manner, more detailed information associated with the roller coaster, for example, maximum angle of inclination, maximum height, maximum speed, predetermined time or the like can be obtained from the information provider.

Figure 4:
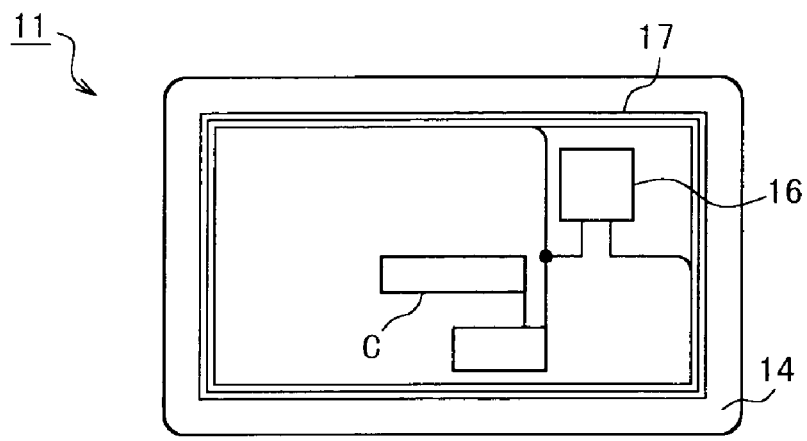
FIG. 4 is an imaginary view illustrating an example of the appearance of information providing electronic parts 11.

Now, a description of information providing electronic parts 11 will be given by way of example. The information providing electronic parts 11 shown in FIG. 4 is provided with a film shaped substrate 14 having its somewhat larger area relevant to the horizontal length L and longitudinal length W of the information reading display 12, for example. Of course, the shape of the information providing electronic parts 11 may be circular or elliptical without being limited to a rectangular shape. The substrate 14 is composed of a resin sheet or the like. The size or material of the substrate 14 is not limited to such resin sheet, either. An IC chip 16 is provided at this substrate 14 so as to provide the advertising information D01 associated with the advertising material 201. This advertising information D01 includes start date and time, place, admission, traffic, contact or the like associated with an amusement part provided with a new roller coaster as shown in the foregoing example.

A loop shaped antenna body 17 is provided at this substrate 14, and is electrically connected to the IC chip 16. The antenna body 17 is formed by winding a copper wire or copper foil pattern of about 0.5 mm in thickness by three turns, for example. A capacitor C as well as antenna body 17 is connected to the IC chip 16. This capacitor consists of a storage electrode dielectric, and an opposite electrode. The memory capacity of the IC chip 16 is about 1.2 Kbytes to 4.0 Kbytes.

FIG. 4 shows only one electrode. This capacitor C is used for synchronizing an antenna body 17 with the carrier frequency of an electromagnetic field, thereby maximizing reception efficiency. Of course, in the case where the lowering of the reception efficiency is allowed, the capacitor C may be eliminated. In addition, with respect to the information providing electronic parts 11, as in an IC card, a sheet member may be provided at the top and bottom thereof. In particular, in the case where the parts are attached on the bottom surface of an advertising material 201, the electronic parts may be used in a state in which no sheet member is provided.

Figure 5:
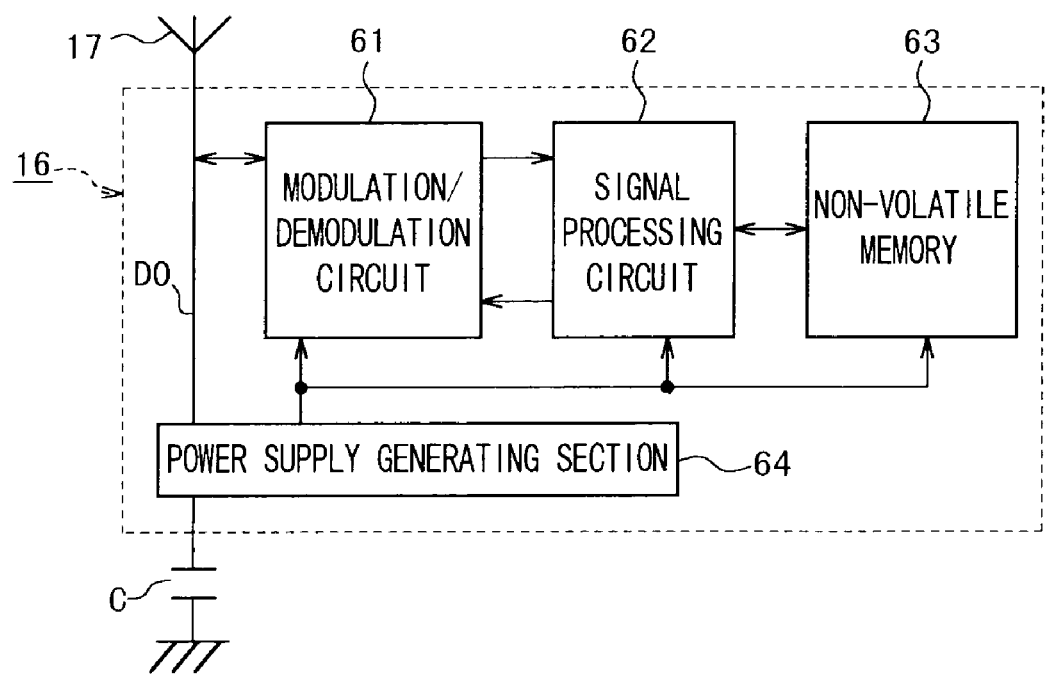
FIG. 5 is a block diagram depicting an example of an internal configuration of an IC chip 16 thereof.

Now, an internal configuration of the IC chip 16 will be described by way of example. The IC chip 16 shown in FIG. 5 has a modulation/demodulation circuit 61, a signal processing circuit 62 and a non-volatile memory 63.

In this example, advertising information D01 is Manchester-encoded. In the IC chip 16, the advertising information D01 obtained in a data row of its predetermined data format is received from an information reading display 12 through an antenna body 17. A modulation/demodulation circuit 61 is connected to the antenna body 17. During information writing, a modulation wave (13.56 MHz) of an amplitude shift (ASK: Amplitude Shift Keying) received by this antenna body 17 is demodulated by means of a demodulation function of the modulation/demodulation circuit 61. The ASK modulation wave is obtained by modulating an amplitude of a carrier signal to be amplitude-shifted by digital advertising information D01. The data transmission speed is 250 k bps/211.875 k bps. The bandwidth is ±300 kHz.

In the modulation/demodulation circuit 61, for example, a data row according to the advertising information D01 is demodulated, the data row being sent from the information reading display 12 to the information providing electronic parts 11. Then, the demodulated data row is transmitted from the modulation/demodulation circuit 61 to the signal processing circuit 62. In response to this transmission, the demodulated data row is decoded in the signal processing circuit 62, and the advertising information D01 is written into a non-volatile memory 63 based on the decoding result. In this manner, the information provider can write advertising information D01 associated with the advertising material 201 as a data row in this memory 63.

In addition, during information reading, the advertising information DO1 read from the non-volatile memory 63 is ASK modulated by means of the modulation function of the modulation/demodulation circuit 61. The data transmission speed is 250 k bps/211.875 k bps. The bandwidth is ±300 kHz, and a modulation signal is Manchester-encoded. In this manner, the advertising information DO1 can be transmitted as a data row of its data format to the information reading display 12 through the antenna body 17.

The power supplies of the information providing electronic parts 11 are used by converting the electromagnetic field energy radiated from the information reading display 12 into an electronic signal. In this example, a power generating section 64 is provided so as to convert the electromagnetic field energy into a stable DC power supply.

For example, the electromagnetic field received by the antenna body 17 is converted into an inductive electromotive force based on a law of electromagnetic induction. By rectifying this electromotive force, a DC power is obtained, and this DC power voltage is supplied to the modulation/demodulation circuit 61, signal processing circuit 62, and nonvolatile memory 63. In an example showing a carrier frequency of about 13.56 MHz by three turns, a voltage of 2.2 V and a power supply of about 1 mA can be obtained. Of course, the power caused by the external high-frequency electromagnetic energy may be taken in the antenna body 17 or other object.

Figure 6:
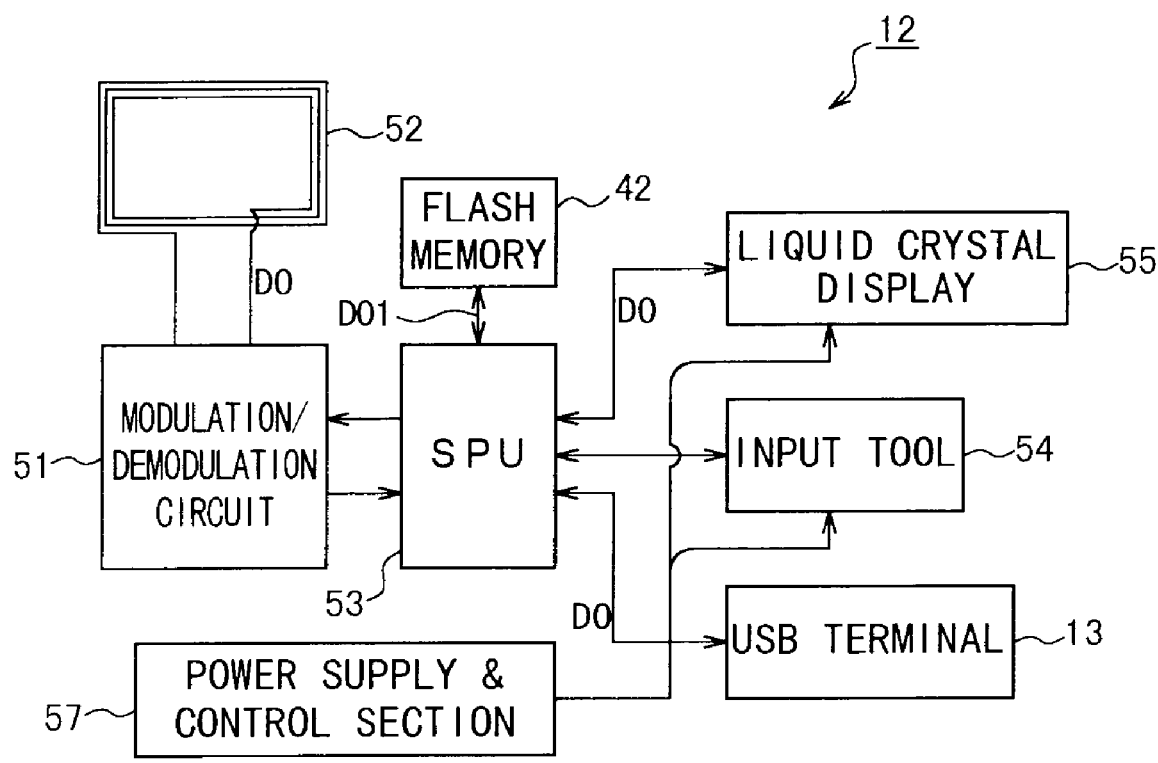
FIG. 6 is a block diagram depicting an example of an internal configuration of an information reading display 12 according to one embodiment.

Now, an internal configuration of an information reading display 12 and its functions will be described by way of example. A loop shaped antenna body 52 is provided at the information reading display 12 shown in FIG. 6 so as to enable communication with the information providing electronic parts 11. The antenna body 17 of the information providing parts 11 and an antenna body 52 of the information reading display 12 are coupled with each other as shown in FIG. 7A in an electromagnetic manner, and are used in an electrically non-contact state.

A modulation/demodulation circuit 51 is connected to this antenna body 52, and the modulation wave sent from the information providing electronic parts 11 is demodulated by using its demodulation function. For example, a data row of the advertising information D01 associated with the advertising material 201 is demodulated, the data row being sent from the information providing electronic parts 11 to the information reading display 12. The data row is configured based on a predetermined data format. For example, one packet of the data row of the advertising information D01 is composed of a header+data shown in FIG. 7B.

A signal processor unit (hereinafter referred to as an SPU) 53 is connected to this modulation/demodulation circuit 51. The SPU 53 comprises: a central processing unit (CPU) for executing a variety of computation processing (not shown); a ROM storing a control program; and a general-purpose RAM used as a work memory. In the SPU 53, a variety of information processing according to demodulated information is performed based on the control program read from the ROM. A flash memory 42 that is shown as an example of non-volatile storage means is connected to the SPU 53, and the advertising information DO1 read from the information providing electronic parts 11 is recorded.

Figure 7A:
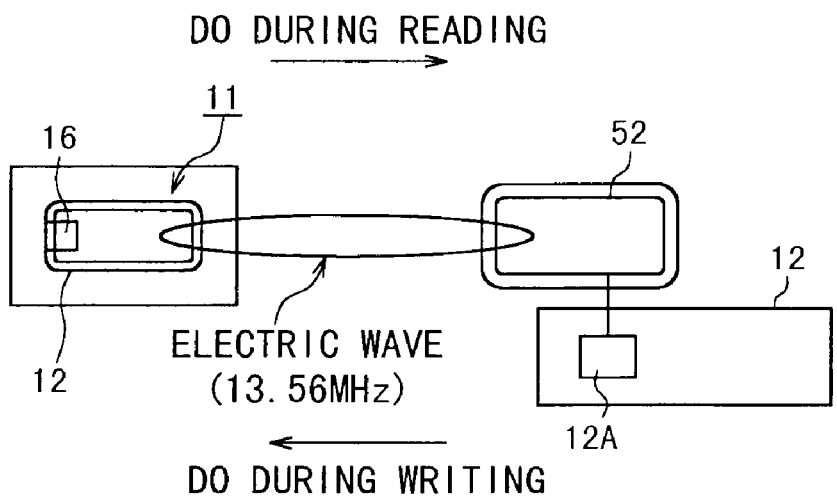
FIG. 7A is a view showing an example of transmitting and receiving a data row concerning advertising information D01 during writing and reading.
Figure 7B:
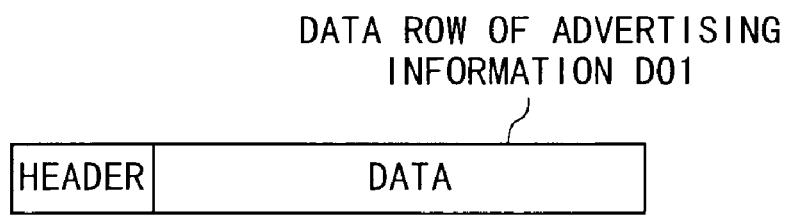
FIG. 7F is an imaginary view showing an example of a data format of the data row.

In addition, with respect to a function used exclusively by the information provider, during writing information shown in FIG. 7A, a variety of information received from the SPU 53 is modulated by the modulation/demodulation circuit 51, and then, a data row of the advertising information D01 caused by the modulation electric wave is transmitted to the information providing electronic parts 11 through the antenna body 52. At this time, in order to efficiently discharge the data row as an electromagnetic field, the data row is ASK modulated by using a carrier wave of 13.56 MHz in frequency. Then, the modulated electric wave is transmitted as an electromagnetic field (about 500 micro-V/m) toward the information providing electric parts 11 by means of the antenna body 52.

A power supply & control section 57 is connected to the modulation/demodulation circuit 51, SPU 53, input tool 54, and liquid crystal display 55, and a DC power is supplied. A dry battery or charge type battery is used for power supply. In particular, a carrier wave of 13.56 MHz in frequency is supplied from the power supply & control section 57 to the modulation/demodulation circuit 51. An information writing function is adopted to disable information writing into the information providing electronic parts 11 in the information reading display 12 possessed by the information user. In this case, the modulation function of the modulation/demodulation circuit 51 is eliminated or a specific modulation method is adopted, thereby preventing the advertising information D01 from being raised by the information user.

In addition, the input tool 54 such as keyboard is connected to the SPU 53 so that an operator can operate an instruction when the instruction is supplied to the SPU 53. In addition, a liquid crystal display 55 consisting of about some tens×some hundreds of pixels is connected so that information read from the information providing electronic parts 11 or information to be written therefrom to information providing electronic parts 11 is displayed intact on the liquid crystal display 55 and is checked. A USB terminal 13 for external device is connected to this SPU 53 so as to make connection to a high-order computer or the like.

Figure 8:
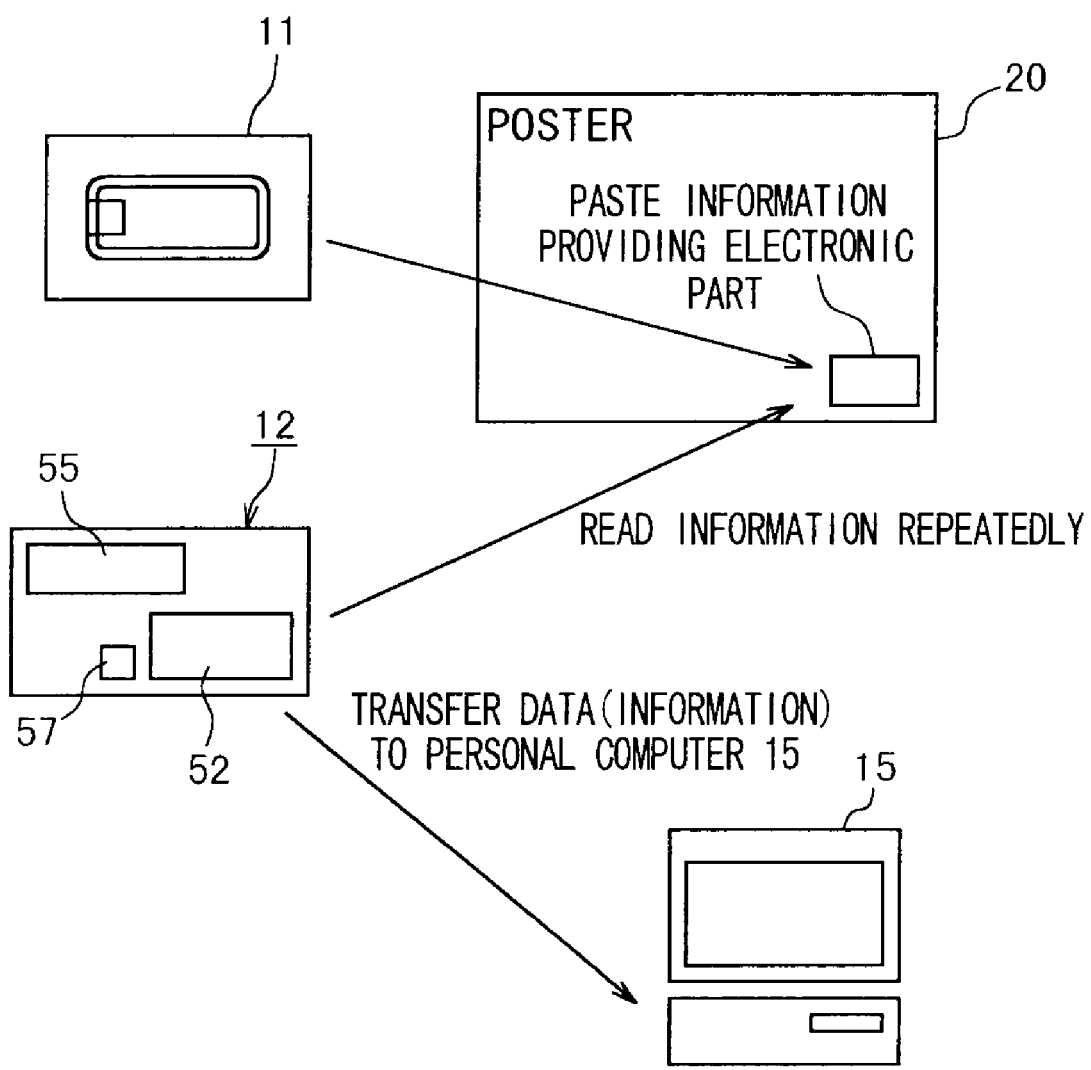
FIG. 8 is an imaginary view showing an example of processing in the electronic advertising system 100 according to the first embodiment.

Then, an information processing method according to the first embodiment will be described with reference to an example of processing in an electronic advertising system 100. FIG. 8 is an imaginary view showing an example of processing according to the information processing method provided as the first embodiment.

In this example, it is presumed that the advertising information D01 on poster 20 concerning a concert of a prominent talented artist is stored in advance in information providing electronic parts 11. In addition, let us show an example when an information reading display 12 is used by connecting the display 12 to a personal computer 15 at home. With this being presumed, information providing electronic parts 11 capable of reading information in an electromagnetic manner is attached to an arbitrary poster 20 on the information provider shown in FIG. 7A and FIG. 7B. For example, card shaped information providing electronic parts 11 are attached on a surface of the poster 20. An information provider presents this poster 20 having the information providing electronic parts attached thereon at station concourse, in train, at cinema, or on street bulletin board and the like.

Then, when an information user sees such advertisement at station concourse, in train, at cinema, or on street bulletin board or the like, the advertising information DO1 is read from the information providing element parts 11 in electromagnetic manner, and is read by using a hand held information reading display 12 as required. At this time, the information reading display 12 and the information providing parts 11 are superimposed with each other, and are coupled with each other in an electromagnetic manner. For example, the information reading display 12 and the personal computer 15 are connected to each other using a USB terminal 13 and communications cable at home, for example, and the advertising information DO1 is read from this information reading display 12. The advertising information DO1 is processed by a personal computer 15, and is converted into information of audible type.

Therefore, in the case where one cannot look at the poster 20 carefully, even if one does not write advertising information D01 such as event or contact associated with that poster 20 which one looked in train on the way of commutation, the advertising information D01 can be stored in the information reading display 12 momentously. One can read the advertising information D01 from the information reading display 12 to the personal computer 15 at home, can see the advertising information D01 associated with the poster 20 on the display of the personal computer 15, or can reserve or purchase an admission ticket directly to the event company of that concert through Internet.

According to the information providing electronic parts 11 of the present invention, advertising information D01 associated with an advertising material 201 can be read freely and as many times as one likes by an electromagnetic information reading display 12. Thus, the advertising information D01 can be transmitted publicly as if a large amount of handbills were distributed. Moreover, there is no need to prepare handbills in advance, these handbills are not disposed at street illegally, thus leading to street beatification.

(3) Second Embodiment

Figure 9:
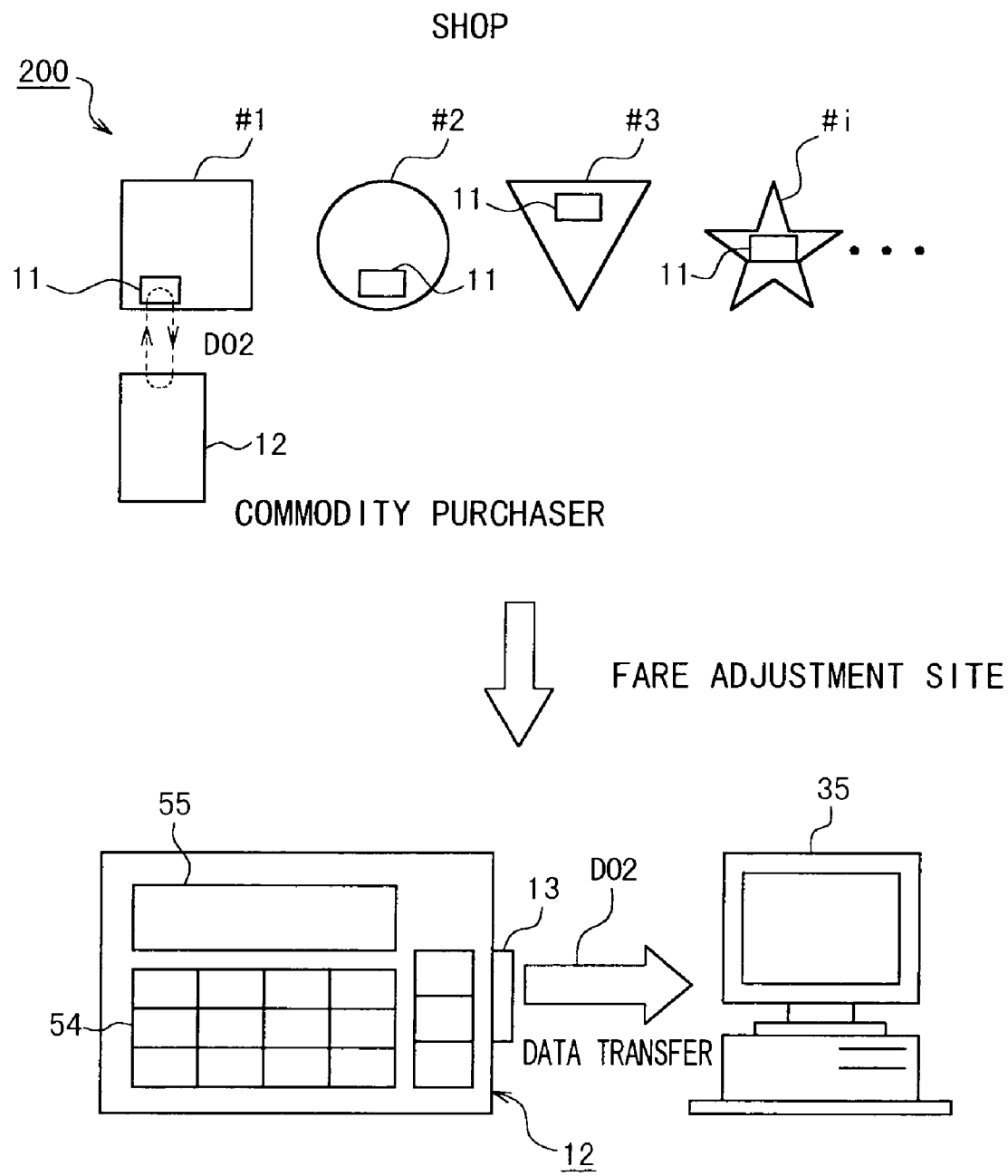
FIG. 9 is an imaginary view showing an example of configuring a commodity selling system 200 according to a second embodiment.

FIG. 9 is an imaginary view showing an example of configuring a commodity selling system 200 according to a second embodiment 2.

This commodity selling system 200 is a system that applies to a plurality of commodity #i (i=1 to n) concerning an entity 2 and provides a commodity purchaser (information user) with the contents of electronic information associated with each commodity #i. In this example, every time each commodity purchaser possesses an information reading display 12 and purchases any of a plurality of commodities #i displayed at a site, the information reading display 12 is applied to a commodity #i or the like to be purchased, price information D02 or the like is read and stored from that commodity #i. When one has purchased everything that one wants, fare adjustment is performed at a specific site, and then, the purchased commodity #i can be received in batch at a package reception site.

In this commodity selling system 200, information providing electronic parts 11 described in the first embodiment are attached to all commodities (□,○,∇,☆, . . . ) #i displayed at shop shown in FIG. 9; and price information D02 or the like associated with that commodity #i is read from the information providing electronic parts 11 in an electromagnetic manner so that the price information D02 recorded in a data format is fare adjusted by a personal computer 35 with its money register function of a fare adjustment site (register). Information providing electronic parts 11 is described with reference to FIG. 4.

The information providing electronic parts 11 are attached so as to be stored to a pocket provided at price tag 19 of commodity #i, for example, by an information provider. After the information providing electronic parts 11 have been stored, the pocket is sealed to prevent it from changed secretly and stolen. In order to emphasize the mount location, a red frame by an outstanding color is given so as to surround the periphery of the mount site. Of course, in the case where the information providing electronic parts 11 are attached to commodity #i itself, a commodity information providing system 300 described in the next embodiment can be constructed, The contents of records into the information providing electronic parts 11 in this system 200 include the name and price of the commodity #i or the like. In addition, manufacturer, year and date of manufacture, telephone number of contact concerning this commodity #1 or the like are recorded. Of course, for an information user who wants to acquire more detailed information concerning the commodity #i, an E-mail address of the information provider as well as telephone number is recorded in the information providing parts 11.

In this commodity selling system 220 as well, the hand held information reading display 12 described in the first embodiment is used as a hand held terminal device with its information read function. A description of this configuration has been given in the first embodiment, and thus, its description is omitted. In this example as well, the information reading display 12 and the information providing electronic parts 11 are coupled with each other in an at least electromagnetic manner, and price information D02 or the like is read from the information providing electronic parts 11 in an electromagnetic manner, and is processed in a data format.

This information reading display 12 is provided so that a commodity purchaser (information user) possesses it individually. In a method for handling the information reading display 12, the information reading display 12 is made close to the information providing electronic parts 11, whereby information is read from the information providing electronic parts 11 in an electromagnetic manner. The approaching distance is about 10 cm in ticket examination type and about 2 cm in ticket selling machine type, depending on the performance of information reading display 12. In the case of extra small type, the electronic parts are made in close contact with each other. When the frequency (luring communication is higher than 13.56 MHz, the distance can be about 50 cm to 70 cm.

This information reading display 12 incorporates a non-volatile memory as described in the first embodiment, and the price information D02 of commodity #i arbitrary read from the information providing electronic parts 11 or the like is recorded. The price information D02 is not erased from a memory even if a power supply is turned OFF.

In this example, the USB terminal 13 described in the first embodiment is provided at the information reading display 12, and thus, this USB terminal 13 or a communications cable according to the RS23C communication protocols is used to enable communication with the personal computer 35. Information processing that cannot be processed by the information reading display 12 can be performed by the personal computer 35.

Instead of wired communication using this communications cable, local radio communication using red infrared-rays may be performed. In this case, a red infrared-ray transmitting and receiving section is provided at the information reading display 12 and the personal computer 35 with its money register function. By way of this red-infrared ray communication, price information D02 or the like is transferred from the information reading display 12 to the personal computer 35 momentously. Of course, a CRT with which the personal computer is provided is adopted to display purchase information after purchased commodity #i has been summed in order for a seller to check the sold item.

Then, a description will be given to an example of processing in the commodity selling system 200. In this example, it is presumed that information providing electronic parts 11 are attached to price tags 19 of all commodity #i displayed in advance at shop; price information D02 or the like associated with the commodity #i is electromagnetically read from the information providing electronic parts 11 by using a hand held information reading display 12; and price information D02 recorded in the data format is fare adjusted by a personal computer 35 with its money register function at a fare adjustment site (register). Of course, each commodity purchaser possesses an information reading display 12.

Figure 10:
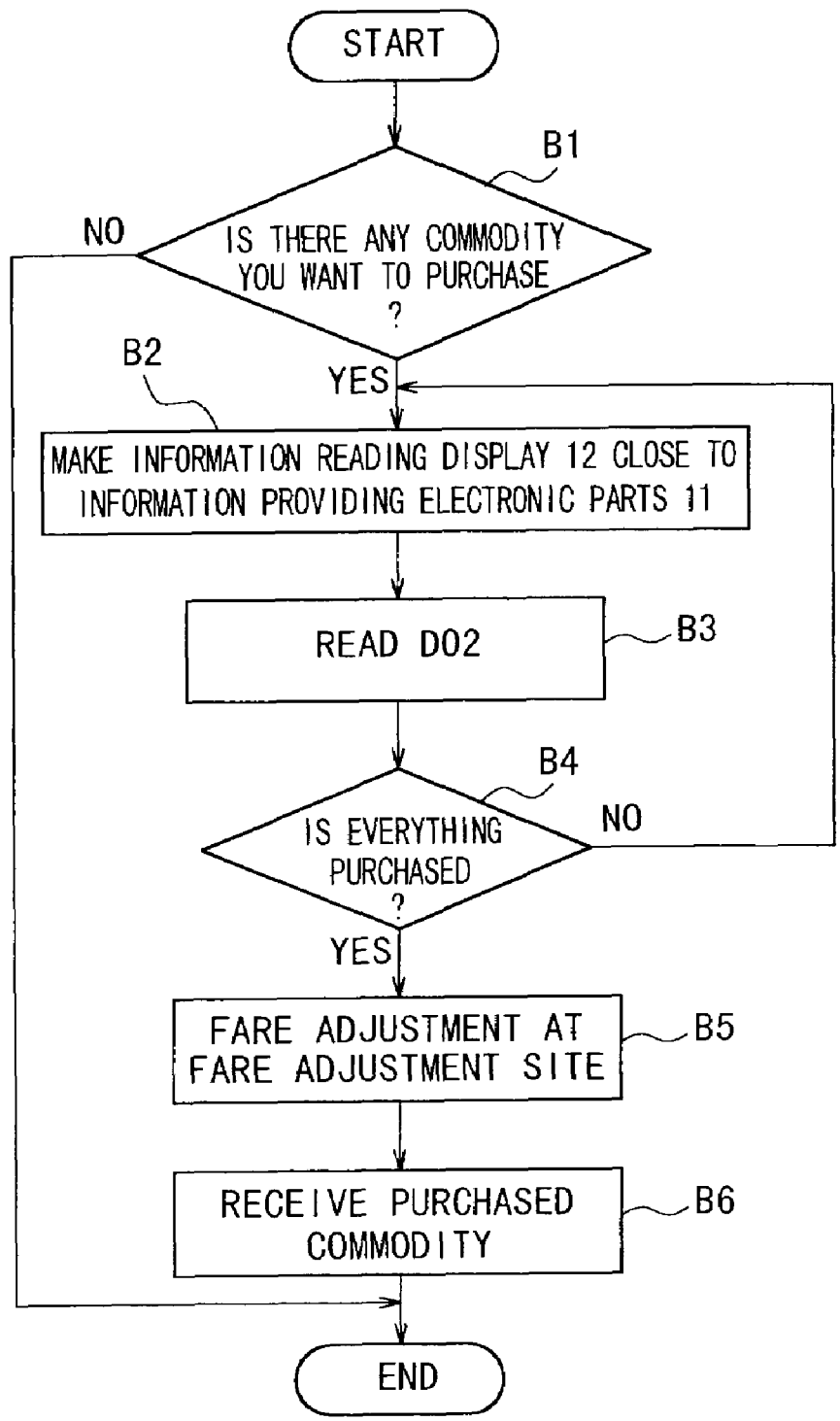
FIG. 10 is a flow chart illustrating an example of processing in the commodity selling system 200.

With this being presumed, at step B1 of the flow chart shown in FIG. 10, a commodity purchaser determined whether or not he or she purchases it at a site at which a plurality of commodity #i are displayed. When the purchaser purchases something, processing goes to step B2 at which the information reading display 12 is made close to the price tag 19 of a desired commodity every time he or she purchases something. At this time, the information reading display 12 and the information providing electronic parts 11 are coupled with each other in an electromagnetic manner.

After processing has gone to the step B3, price information D02 is read from the information providing electronic parts 11 of that commodity #1, and is stored in the information reading display 12. Then, processing goes to step B4 at which it is determined as to whether or not everything has been purchased. This determination is made by the commodity purchaser. In the case where everything is not purchased, processing reverts to step 132 at which the information reading display 12 is made close to the price tag 19 of desired commodity #i so as to repeat processing in the same way as above.

In the case where everything is purchased, fare adjustment is performed at a specific fare adjustment site. Fare adjustment may be an automatic bank transfer system by way of online system or may be a cash payment system. In the case of an online system, the personal computer 35 is connected to a personal computer at bank via communications means such as telephone line, and settlement is made after the account balance of the commodity purchaser has been correlated. Then, the purchased commodity #i is moved to step B6 so as to be received in batch at a predetermined package reception site.

Thus, according to the commodity selling system 200 of the second embodiment, there is solved a problem that packages are increased at shopping cart every purchase until the purchaser has reached a fare adjustment site as in a conventional system. The commodity purchaser may wait at registry while the purchaser holds one information reading display 12.

Moreover, the name and price information D02 according to a purchased commodity #i is recorded in the information reading display 12. Thus, the purchaser reads the price information D02 or the like from the information reading display 12 to his or her personal computer 15 or the like at home, and can record the data concerning the purchased commodity #1 in a balance sheet automatically on the display of the personal computer 15. When this commodity #i is found to be faulty, information can be directly processed from additional information of the commodity #i so as to make a phone call to a manufacturer about handling or request for replacement of the commodity #i, as described in the next embodiment.

(4) Third Embodiment

Figure 11:
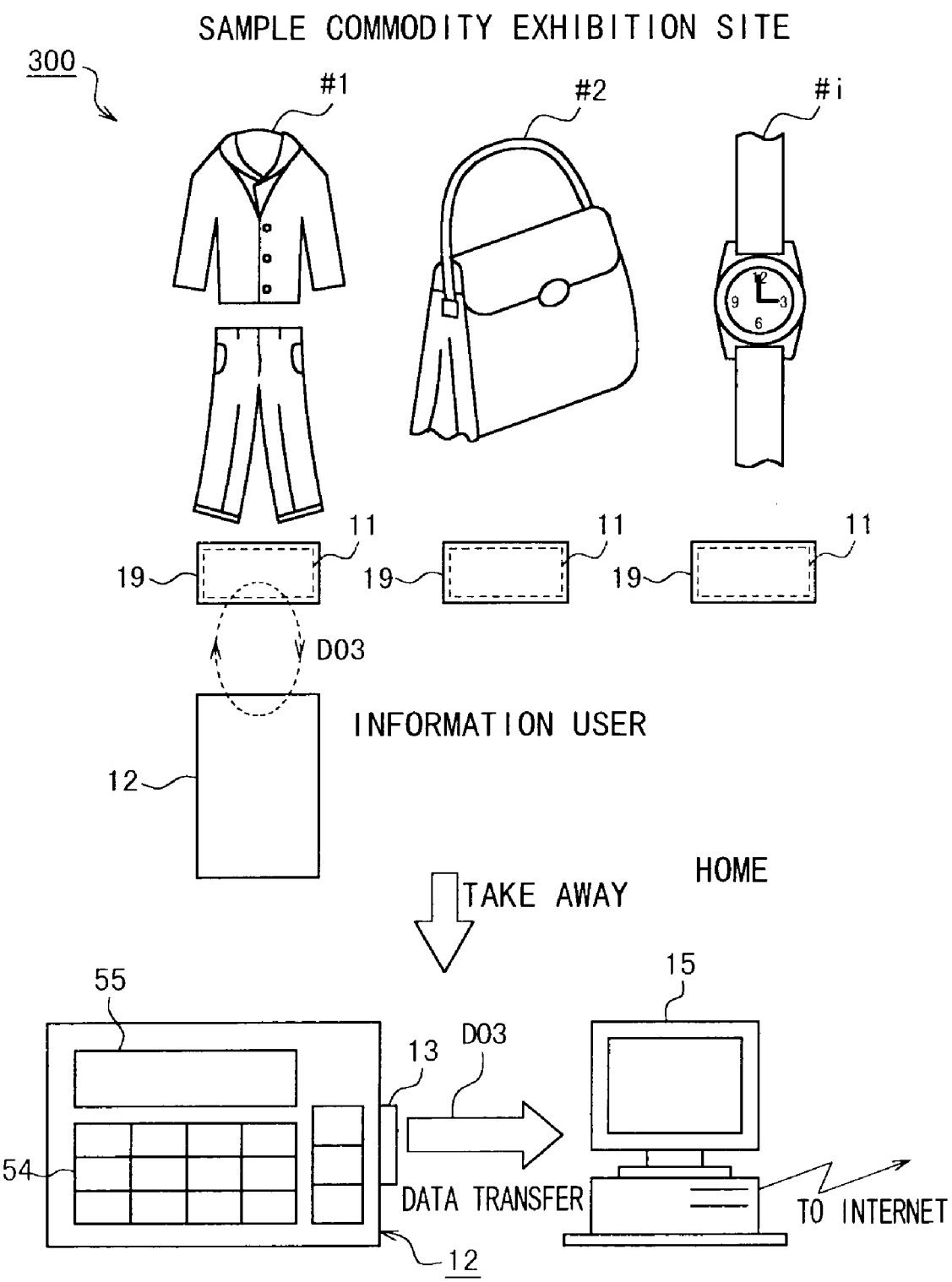
FIG. 11 is an imaginary view showing an example of configuring a commodity information providing system 300 according to a third embodiment.

FIG. 11 is an imaginary view showing an example of configuring a commodity information providing system 300 according to a third embodiment.

In this example, information providing electronic parts 11 are attached to commodity #i at shop or sales sample in online shopping (Internet shopping) with respect of an entity 2, and additional information is recorded in the information providing electronic parts 11. The additional information is directed to information such as the features, functions, or specification of commodity #i other than the name and price information of the commodity #i which cannot be included in a conventional paper tag. Therefore, if commodity #i is found to be faulty, one can inquire a manufacture directly from additional information of the commodity #i, and can know how to handle it or ask for replacement of such faulty commodity #i.

In particular, a sample exhibition site at which sales samples in Internet shopping are gathered is provided. In this system, with respect to color, size or the like of commodity #i which is hardly recognized from net sales information downloaded into a personal computer 15 via a provider, an information user visually checks them at the sample exhibition site, reads additional information on his or her own information reading display 12 from the information providing electronic parts 11 attached to the commodity #i, making it possible to purchase what he or she really wants and to enjoy convenience such as online ordering or settlement.

In the case where a purchaser wants to purchase commodity #i, he or she may purchase it, but may determine such purchase in comparison with other commodities. In this case, the purchaser reads the additional information in the information reading display 12 at shop or sample exhibition site, transfers the additional information to the personal computer 15 at home or in office, and performs display processing or the like, thereby making it possible to determine whether or not to purchase that commodity #i.

In the commodity information providing system 300 shown in FIG. 11, for example, the information providing electronic parts 11 described in the first embodiment are attached to all commodity #i such as business suits, handbags, wristwatch or the like displayed at a sample exhibition site for sales samples in Internet shopping. By using a hand held information reading display 12, information associated with that commodity #i is read from the information providing electronic parts 11 in an electromagnetic manner; additional information D03 recorded in a data format is processed by a personal computer 15 at home or in office, and is converted into information of audible type. The information providing electronic parts 11 have been described with reference to FIG. 4. The information providing electronic parts 11 are attached to a price tag 19 or the like of commodity #i by the information provider.

The contents of records into the information providing electronic parts 11 in this system 300 include the name, price, manufacturer, date of manufacture, features, functions, specification, or telephone number of contact concerning the commodity #i. Of course, for an information user who wants to acquire more detailed information concerning this commodity #i, an E-mail address of the information provider as well as telephone number is recorded in the information providing electronic parts 11.

In this commodity information providing system 300 as well, the hand held information reading display 12 described in the first embodiment is used as a hand held terminal device with its information read function. The contents of this configuration has been described in the first embodiment, and thus, a duplicate description is omitted here. In this example as well, the information reading display 12 and information electronic parts 11 are coupled with each other in an at least electromagnetic manner. Additional information D03 is read from the information providing electronic parts 11 in an electromagnetic manner, and is converted to be recorded in a data format.

This information reading display 12 is provided so that a commodity purchaser (information user) possesses it individually, In a method for mounting the information reading display 12, as described in the first and second embodiments, the information reading display 12 is made close to information providing electronic parts 11, whereby additional information D03 is read from the information providing electronic parts 11.

This information reading display 12 incorporates a non-volatile memory as described in the first embodiment. In this memory, there is recorded additional information D03 or the like of commodity #i arbitrary read from the information providing electronic parts 11. The additional information D03 is not erased from the memory even if a power supply is turned OFF. In this example, additional information D03 is processed by the information reading display 12, and is converted into information of audible type. The information obtained by processing by this additional information D03 is displayed intact on a liquid crystal display element or the like of the information reading display 12, and the content can be seen immediately on the spot.

In addition, the information reading display 12 is connected to the personal computer 15 using the provided USB terminal 13 or communications cable according to RS23C communications protocols. Additional information D03 that cannot be processed by the information reading display 12 is provided for communication processing. Of course, the information processed into audible type may be displayed on a CRT with which a personal computer is provided. In addition, an E-mail address of the information provider is extracted from additional information D03, connection to the information provider is made via Internet using the personal computer 15 so that more detailed information is obtained, and processing goes to accounting processing of the commodity #i Now, an example of processing in the commodity information providing system 300 will be described here. In this example, it is presumed that information providing electronic samples 11 are attached in advance to price tags 19 of all of the commodity #i displayed at a sample exhibition site in Internet shopping; additional information D03 or the like associated with that commodity #i is read from the information providing electronic parts 11 in an electromagnetic manner by using a hand held information reading display 12; additional information D03 recorded in the data format processed by a personal computer 15 at home or in office. Of course, it is presumed that each commodity purchaser possesses the information reading display 12.

Figure 12:
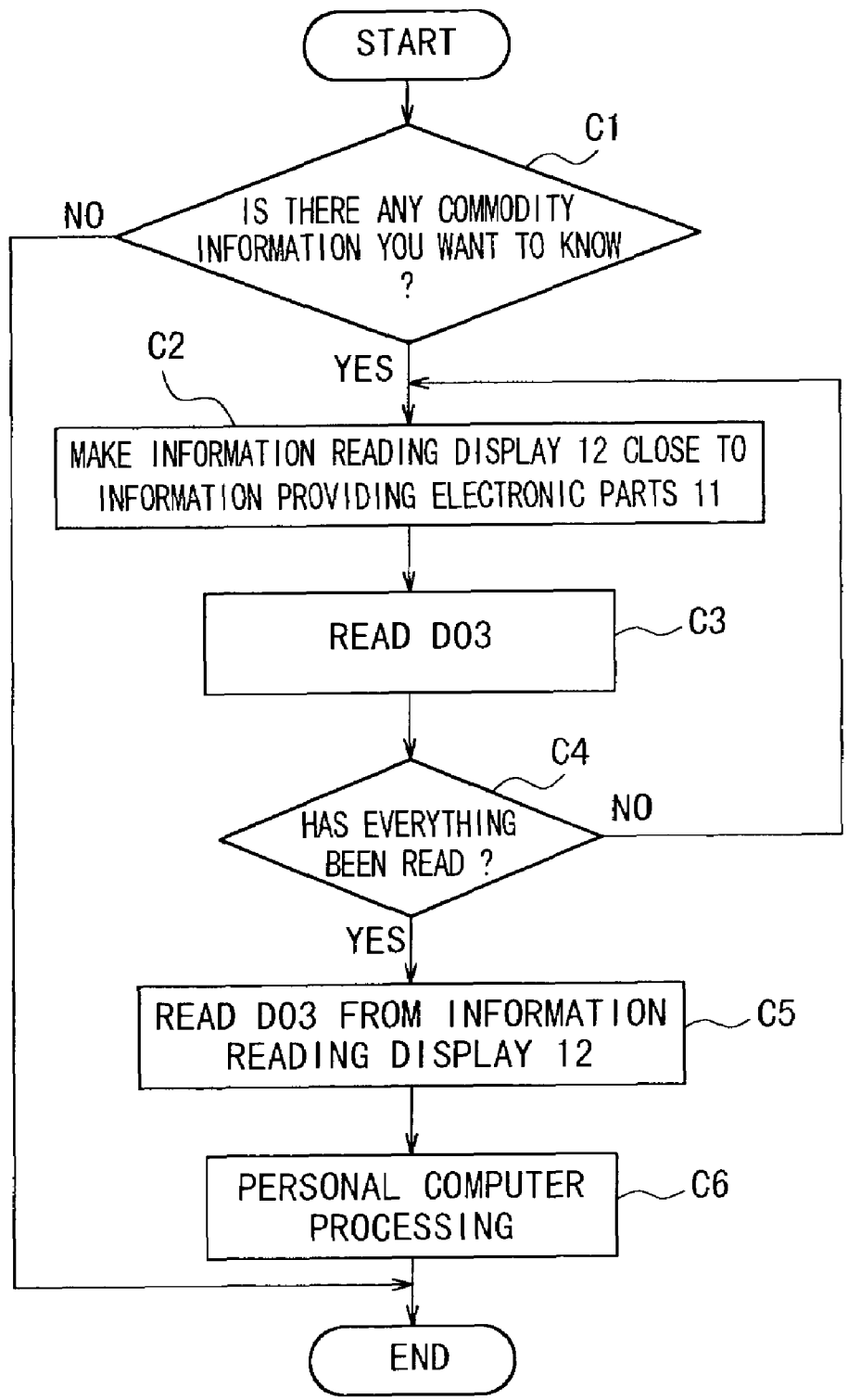
FIG. 12 is a flow chart illustrating an example of processing in the commodity information providing system.

With this being presumed, at step C1 of the flow chart shown in FIG. 12, a commodity purchaser determines whether or not there is desired information concerning sample commodity #i at an exhibition site at which a plurality of sample commodities #i are displayed. This determination is made by the commodity purchaser. In the case where there is desired information concerning sample commodity #i, processing goes to step C2 at which the information reading display 12 is made close to that price tag 19 or the like every sample commodity #i corresponding to such desired information. At this time, the information reading display 12 and information providing electronic parts 11 are coupled with each other in an electromagnetic manner.

Then, processing goes to step C3 at which additional information D03 is read from information providing electronic parts 11 of that commodity #i, and is stored in that information reading display 12. Then, processing goes to step C3 at which it is determined as to whether or not all the desired information concerning sample commodity #i is read. This determination is made by the commodity purchaser. In the case where all the desired information concerning sample commodity #i is not read, processing reverts to step C2 at which the information reading display 12 is made close to the price tag 19 of sample commodity #i corresponding to such desired information so that the processing is repeated in the same manner as the above.

In the case where all the desired information concerning sample commodity #i is read, processing goes to step C5 at which additional information D03 is processed by using the information reading display 12, and information of audible type is displayed intact on a liquid crystal display element or the like so that the content can be seen immediately on the spot.

Then, processing goes to step C6 at which the USB terminal 13 of the information reading display 12 is connected to the personal computer 15 by using a communication cable, the content of information processed by the information reading display 12 or additional information D03 that could not be processed there are transferred to the personal computer 15. At the personal computer 15, information processed in audible type, for example, the characteristics, functions, or specification of wrist watch that is sample commodity #i is displayed on a CRT with which the personal computer is provided. In addition, an E-mail address of an information provider is extracted from additional information D03 so that more detailed information is obtained from the information provider via Internet or processing goes to accounting processing of that commodity #i.

In this manner, according to the commodity information providing system 300 of the third embodiment, in the case where there is provided a sample exhibition site at which sales samples are gathered in Internet shopping, with respect to the color, size or the like of commodity #i that is hardly recognized from net sales information downloaded into the personal computer 15 via a provider, an information user checks them at this sample exhibition site, reads additional information D03 from the information providing electronic parts 11 attached to that commodity #i to the information reading device 12, thereby making it possible to purchase what he or she really wants. In addition, the purchaser can enjoy convenience such as online ordering or settlement.

Moreover, when commodity #i is found to be faulty, the purchaser direct inquires that manufacturer from additional information D03 of that commodity #i by combining the second embodiment so that the purchaser can know the handling of the commodity #1 and ask for replacement of the commodity #i or the like.

(5) Fourth Embodiment

Figure 13:
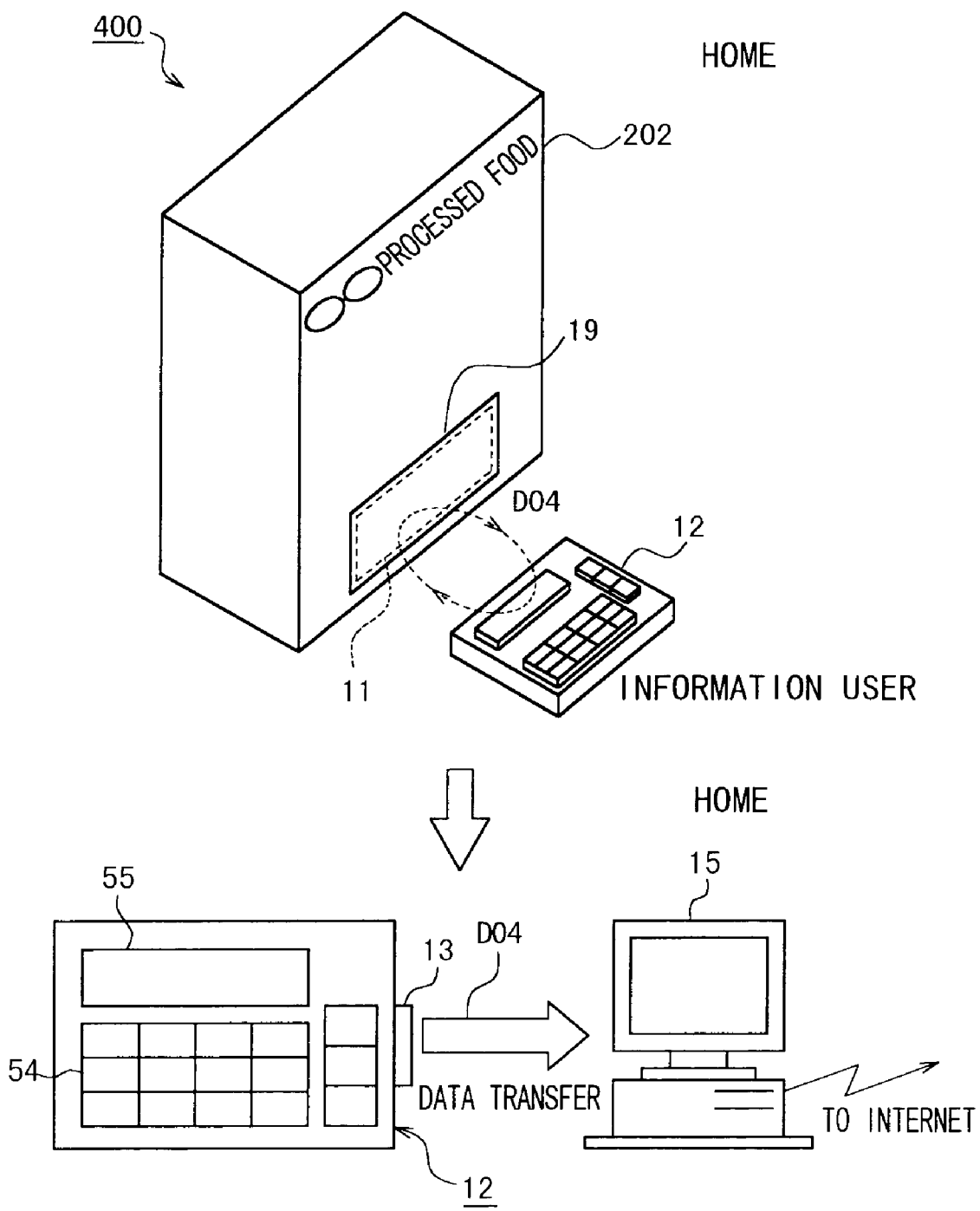
FIG. 13 is an imaginary view showing an example of configuring a food information providing system 400 according to a fourth embodiment.

FIG. 13 is an imaginary view showing an example of configuring a food information providing system 400 according to a fourth embodiment.

In this example, information providing electronic parts 11 are attached to foods with respect to an entity 2. Food information D04 is recorded in the information providing electronic parts 11 at a food shop. The food information D04 used here includes information such as name, price, life of the food 202, recipe, information on wines suitable to the food, calorie, or origin or any other information that cannot be included in a conventional paper tag. Therefore, a food purchaser purchases the food 202 with information providing electronic parts 11, whereby the purchaser can obtain information such as life, recipe, information on wines suitable to the food, calorie, origin with respect of the food 202, and can perform menu management of that food 202.

In the food information providing system 400 shown in FIG. 13, for example, the information providing electronic parts 11 described in the first embodiment are attached to all foods 202 displayed at a food shop. The information providing electronic parts 11 are attached to containers or housings for packing without being direct attached to the foods 202.

The contents of records into the information providing electronic parts 11 in this system 400 include information on the name, price, manufacturer, date of manufacture, life, recipe, information on wines suitable to the food, calorie, origin or telephone number of contact concerning the foods 202.

Of course, for an information user who wants to obtain more detailed information concerning these foods 202, an E-mail address of an information provider as well as telephone number is recorded in the information providing electronic parts 11. The information providing electronic parts 11 has been described with reference to FIG. 4. These information providing electronic parts 11 are attached to price tags 19 of the foods 202 at a food shop (by the information provider).

In this food information providing system 400 as well, there is used the hand held information reading display 12 described in the first embodiment. For example, the information reading display 12 and the information providing electronic parts are coupled with each other in an at least electromagnetic manner, and food information D04 is read from the information providing electronic parts 11 in an electromagnetic manner so as to be recorded in the data format.

This information reading display 12 is provided so that an information user possesses it individually. In a method for handling the information reading display 12, as described in the first to third embodiments, the information reading display 12 is made close to the information providing electronic parts 11, whereby food information D04 is read from the information providing electronic parts 11 in an electromagnetic manner.

This information reading display 12 incorporates a non-volatile memory 42 as described in the first embodiment. In this memory 42, there is recorded food information D04 or the like on the foods 202 arbitrarily read from the information providing electronic parts 11. The food information D04 is not erased from the memory even if a power supply is turned OFF. In this example, food information D04 processed into audible type by the information reading display 12 is displayed intact by a liquid crystal display element of the information reading display 12 so that the contents can be seen immediately on the spot.

In addition, a USB terminal 13 provided at the information reading display 12 is connected to a personal computer 15 at home by using a communications cable. Food information D04 of the information reading display 12 is transferred, and a video according to a detailed cooking method is displayed on a CRT with which a personal computer is provided. Together with this video, voice guidance is output from a provided speaker. A video such as information on wines suitable to this cuisine is displayed.

Now, an example of processing in the food information providing system 400 will be described here. In this example, it is presumed that information providing electronic parts 11 are attached to price tags 19 of all foods 202 displayed in advance on a food shop; when that food is purchased, and is brought back home, food information D04 or the like associated with that food 202 is read from the information providing electronic parts 11 in an electromagnetic manner; and the food information D04 recorded in a data format is processed by a personal computer 15 at home. Let us show an example when a cooking method is referred to from the food information D04. Of course, it is presumed that each food purchaser (information user) possesses the information reading display 12.

Figure 14:
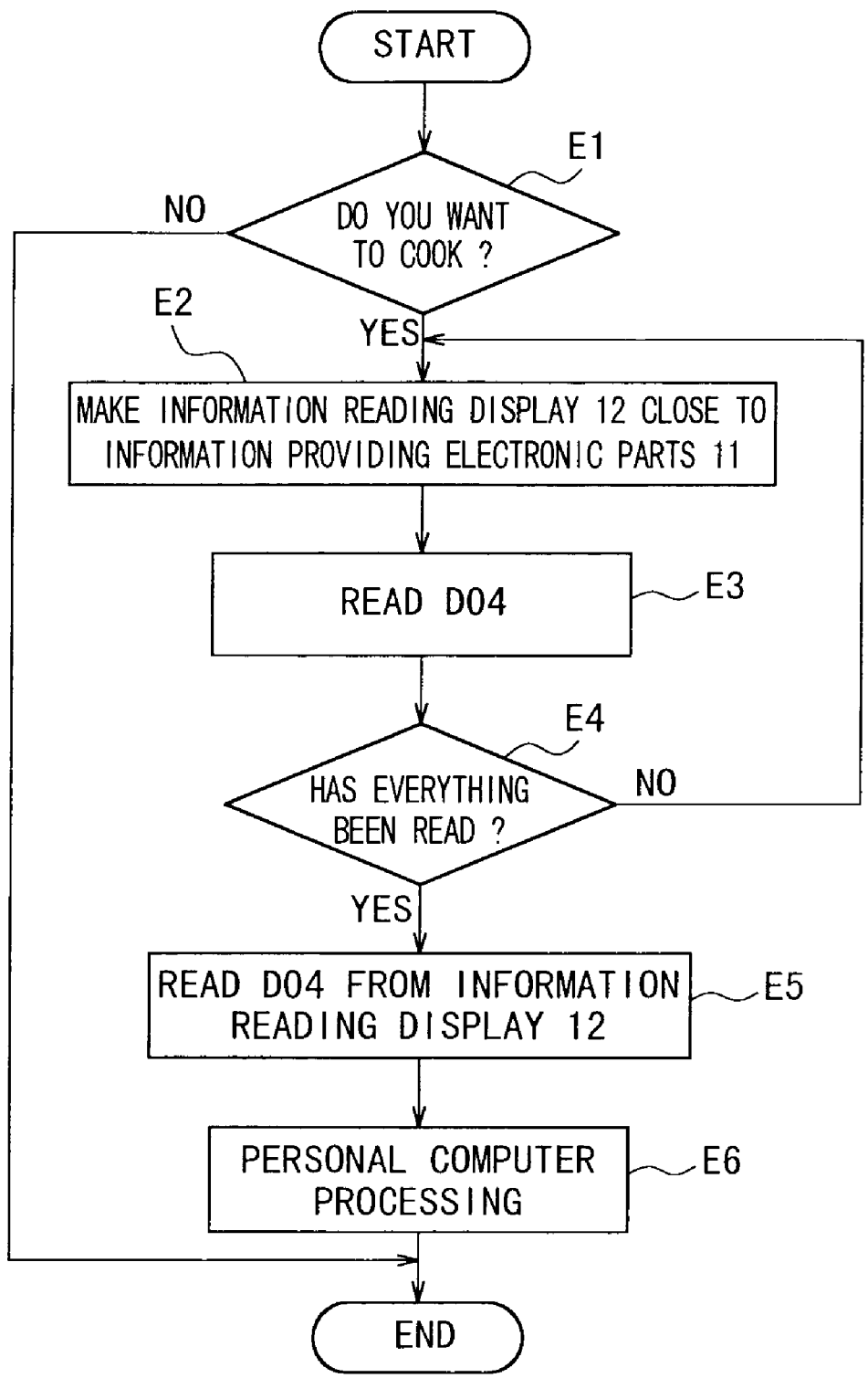
FIG. 14 is a flow chart illustrating an example of processing in the food information providing system 400.

With this being presumed, at step E1 of the flow chart shown in FIG. 14, a food purchaser determined whether or not there is a desired food 202 at a food shop at which a plurality of foods 202 are displayed. This determination is made by the food purchaser. In the case where a desired food 202 is present, the purchaser purchases a food 202 with its information providing electronic parts, and brings it back home.

At home, during preparation for cook, at step E2, the information reading display 12 is made close to the price tag 19 or the like of the food 202. At this time, the information reading display 12 and the information providing electronic parts 11 are coupled with each other in an electromagnetic manner. Then, processing goes to step E3 at which food information D04 is read from the information providing electronic parts 11 of the food 202, and is stored in the information reading display 12. Then, processing goes to step E4 at which an information user determines whether or not the food information D04 is read. In the case where all the food information D04 is not read, processing reverts to step E2 at which information read processing is repeated.

In the case where all the food information D04 is read, processing goes to step E5 at which the food information D04 is read from a flash memory 42 of the information reading display 12, and is processed into audible type. This food information D04 is displayed intact on a liquid crystal display element or the like so that the content can be seen immediately on the spot.

Then, processing goes to step E6 at which the USB terminal 13 of the information reading device 12 is connected to the personal computer 15 by using a communications cable; and the content of information processed by the information reading display 12 or the food information D04 that cannot be processed there are transferred to the personal computer 15 or the like. At the personal computer 15, the information processed into audible type, for example, the cooking method of the food 202 is displayed on a provided CRT. In addition, an E-mail address of the information provider is extracted from the food information D04 so that information concerning a more detailed cooking method is obtained from the information provider via Internet.

In this manner, according to the food information providing system 400 of the fourth embodiment, the information providing electronic parts 11 are attached to foods, and food information D04 is recorded in the information providing parts 11 at a food shop. Therefore, with respect to the food 202, there can be obtained information such as life, recipe, information on wines suitable to the cuisine, calorie, origin or the like. The management of life or menu of the food 202 can be performed based on the food information D04.

The life may be linked with a computer of a refrigerator (not shown). In this case, red infrared-ray transmitting and receiving sections are provided at both of the information reading display 12 and the refrigerator computer. By way of this red infrared-ray communication, information on life or the like is transferred from the information reading display 12 to that computer momentously. This information concerning life is added to the inventory management information so that the user's diet is managed by that computer.

Moreover, when the food 202 is found to be faulty, a purchaser inquires a manufacturer directly from the food information D04 of that food 202 so that the purchaser can know the countermeasure or ask for replacement of the food 202.

(6) Fifth Embodiment

Figure 15:
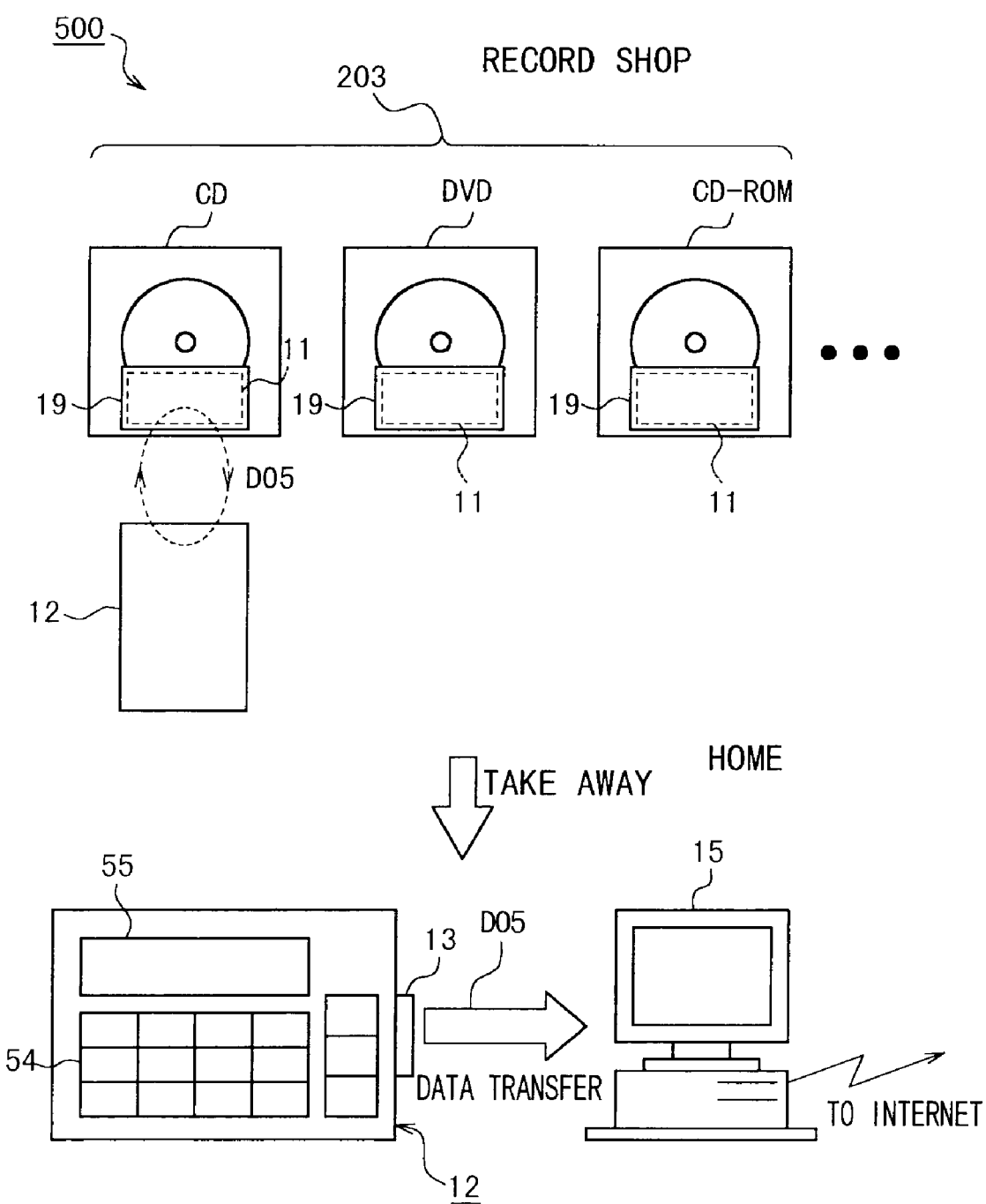
FIG. 15 is an imaginary view showing an example of configuring a recording medium information providing system 500 according to a fifth embodiment.

FIG. 15 is an imaginary view showing an example of configuring a recording medium information providing system 500 according to a fifth embodiment.

In this example, information providing electronic parts 11 are attached to recording media 203 such as CD or DVD with respect to an entity 2. The information providing electronic parts 11 record experience information. The experience information is directed to name and price of a recording medium; audio information on an introductory portion of a music according to that recording medium; or voice and video information on the introductory portion of a cinema. In this system, a purchaser can read experience information from the information providing electronic parts 11 attached to the recording media 203 by means of the information reading display 12 brought into a record shop, checks this experience information, thereby making it possible to purchase what he or she really wants to. In addition, the purchaser can enjoy convenience such as online ordering or settlement.

In the case where a media purchaser wants to purchase a recording medium 203, he or she may purchase it, but may determine such purchase by comparing it with another medium. In this case, the purchaser can read experience information in the information reading display 12 at a record shop; bring it back home or office, transfer the experience information to a personal computer 15 or the like; and determine whether or not to purchase the recording medium 203.

In the recording medium information providing system 500 shown in FIG. 15, for example, the information providing electronic parts 11 described in the first embodiment are attached to all recording media 203 such as CD, CD ROM, DVD . . . displayed at a record medium 203. Experience information D05 associated with the recording media 203 is read from the information providing electronic parts 11 in an electromagnetic manner by using the hand held information reading display 12. Then, the experience information D05 recorded in a data format is processed by a personal computer 15 at home or in office, and is converted into information of audible type.

The information providing electronic parts 11 have been described with reference to FIG. 4. In the information providing electronic parts 11, for example, a CD or DVD information provider records audio information of an introductory portion of a music according to the recording medium 203 or voice and video information of an introductory portion of a cinema. The recording media with the information providing parts are displayed at a record shop in order to provide the information associated with these recording media 203 to the information user.

The information providing electronic parts 11 are attached to price tags 19 or the like of the recording media 203 by the information provider. Of course, the information providing electronic parts 11 may be attached to packages or housings and the like of the recording media 203 or may be provided as an additional material of the recording media 203 in a card format. In order to emphasize the mount location (presence) of the information providing electronic parts 11, an indication indicative of its presence is given on the surface of the recording media 203.

The contents of records into information providing electronic parts 11 in this system 500 include information associated with the name, price, producer of the recording media 203 or telephone number of contact concerning the recording media 203, for example, as well as the aforementioned contents. Of course, for an information user who wants to obtain more detailed information concerning the recording media 203, an E-mail address of the information provider as well as telephone number is recorded in the information providing electronic parts 11.

In this recording medium information providing system 500 as well, the hand held information reading display 12 described in the first embodiment is used as a hand held terminal device with its information read function. The contents of this configuration has been described in the first embodiment, and a duplicate description thereof is omitted. In this example, the information reading display 12 and the information providing electronic parts 11 are coupled with each other in an at least electromagnetic manner. Then, experience information D05 is read from the information providing electronic parts 11, and is converted to be recorded in a data format.

This information reading display 12 is provided so that a medium purchaser (information user) possesses it individually. In a method for handling the information reading display 12, as described in the first to fourth embodiments, the information reading display 12 is made close to information providing parts 11, whereby experience information D05 is read from the information providing electronic parts 11 in an electromagnetic manner.

This information reading display 12 incorporates a ion-volatile memory as described in the first embodiment, and the experience information D05 or the like of the recording media 203 arbitrarily read from the information providing electronic parts 11 is recorded. This experience information D05 is not erased from a memory even if a power supply is turned OFF. In this example, the experience information D05 is processed by means of the information reading display 12, and is converted into information of audible type. The information obtained by processing the experience information D05 is displayed intact on a liquid crystal display element of the information reading display 12 or the like so that the contents can be seen immediately on the spot.

In addition, in this example as well, the USB terminal 13 of the information reading display 12 and the personal computer 15 are connected to each other using a communications cable. The experience information D05 that cannot be processed on the information reading display 12 is provided for communication processing. Of course, the information processed in audible type may be displayed on a CRT with which a personal computer is provided. In addition, an E-mail address of the information provider is extracted from the experience information D05, and connection to the information provider is made by using the personal computer 15 via Internet so that more detailed information is obtained.

Now, an example of processing in the recording medium information providing system 500 will be described. In this example, it is presumed that the information providing electronic parts 11 are attached to price tags 19 of all recording media 203 displayed in advance at a record shop; experience information D05 or the like associated with the recording media 203 is read from the information providing electronic parts 11 in an electromagnetic manner by using the hand held information reading display 12; the experience information D05 recorded in a data format is processed by means of the personal computer 15 at home or in office. Of course, it is presumed that each media purchaser possesses the information reading display 12.

Figure 16:
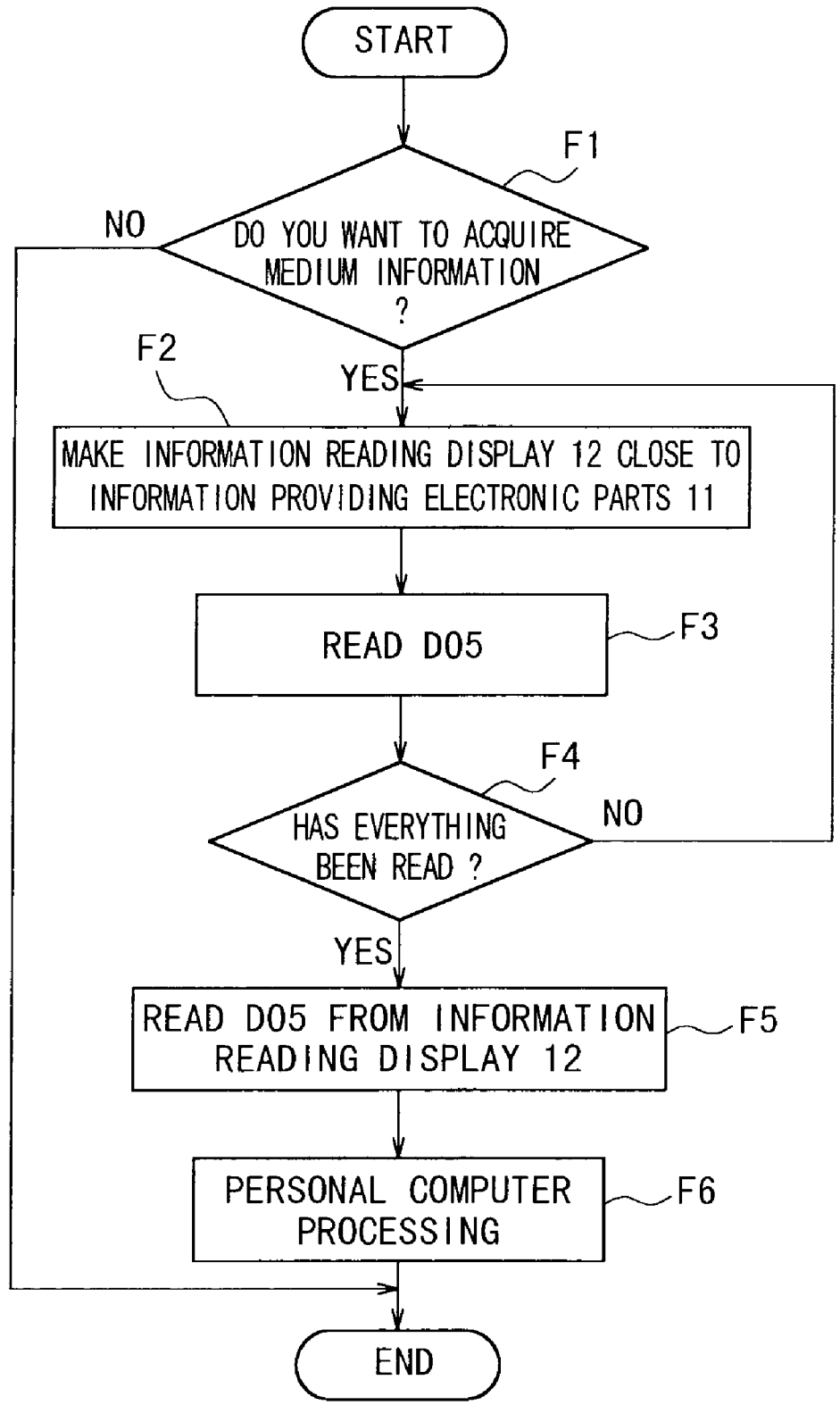
FIG. 16 is a flow chart illustrating an example of processing in a recording medium information providing system 500.

With this being presumed, at step F1 of the flow chart shown in FIG. 16, a medium purchaser determines whether or not desired information concerning recording media 203 is present at a record shop. This determination is made by the media purchaser. In the case where desired information concerning recording media 203 is present, processing goes to step F2 at which the information reading display 12 is made close to the price tag 19 or the like by each recording medium 203 corresponding to desired information. At this time, the information reading display 12 and the information providing electronic parts 11 are coupled with each other in an electromagnetic manner.

Then, processing goes to step F3 at which experience information D05 is read from the information providing electronic parts 11 of the recording media 203, and is recorded in the information reading display 12. Then, processing goes to step F4 at which it is determined as to whether or not all the desired information concerning the recording media 203 are read. This determination is made by the media purchaser. In the case where all the desired information concerning the recording media 203 is not read, processing reverts to step F2 at which the information reading display 12 is made close to the price tag 19 of the recording medium 203 corresponding to desired information, and processing is repeated in the same manner as above.

In the case where all the desired information concerning recording media 203 is read, processing goes to step F5 at which experience information D05 is processed by using the information reading display 12, and information of audible type is displayed intact on a liquid crystal display element or the like so that the contents can be seen immediately on the spot.

Then, processing goes to step F6 at which the USB terminal 13 of the information reading display 12 and the personal computer 15 are connected to each other using a communications cable, and the contents of information processed by the information reading display 12 or experience information D05 that cannot be processed there is transferred to the personal computer 15. At the personal computer 15, the information processed in audible type, for example, a video of an introductory portion of a new release cinema according to the DVD is displayed on a provided CRT, and an E-mail address of an information provider is extracted from experience information DOS so that more detailed information is obtained from the information provider via Internet.

In this manner, according to the recording medium information providing system 500 of a fifth embodiment, experience information D05 is read from the information providing electronic parts 11 attached to recording media 203 into the information reading display 12 brought at a record shop, and a purchaser checks the experience information D05 so that the purchase can purchase what he or she really wants.

Moreover, when a recording medium 203 is found to be faulty, a purchaser inquires a manufacturer directly from experience information D05 of the recording medium 203 by combining the second embodiment so that the purchaser can know a method of handling the medium or ask for replacement of the recording medium 203.

The recording media 203 may be VTR, book, or magazine without being limited to CD or DVD. The information providing electronic parts 11 are attached to these VTRs, books, or magazines and the like, a video of an introductory portion of dynamic VTR information is shown, and the table of contents or an introductory portion of a story are read by text in the case of a book or magazine.

(7) Sixth Embodiment

FIG. 17 is an imaginary view showing an example of configuring an exhibition information providing system 600 according to a sixth embodiment.

In this example, it is presumed that information providing electronic parts 11 are attached to exhibited materials concerning an entity 2 in museum or in art gallery; and exhibition information is recorded in the information providing electronic parts 11. The exhibition information contains: the name of the exhibited material; picture guidance information associated with the exhibited material; information on photographic conditions; and voice information on artists or models. In this system, exhibition information is read from the information providing electronic parts 11 attached to the exhibited materials by means of the information reading display 12 brought into museum or art gallery so that the exhibition information is checked by the information reading display 12. In the case where an information user has different interest with the exhibited material, while the exhibition information is read in the information reading display 12, the purchaser brings the display back home or office, transfers the exhibition information to a personal computer 15 or the like so as to perform display processing or the like.

In an exhibition information providing system 600 shown in FIG. 17, the information providing electronic parts 11 described in the first embodiment are attached to all exhibited materials 204 such as pictures, photographs . . . displayed in museum or in art gallery. Then, exhibition information D06 associated with the exhibited materials 204 is read from the information providing electronic parts 11 in an electromagnetic manner by using a hand held information reading display 12. Thereafter, the exhibition information D06 recorded in a data format is processed on the spot or by means of the personal computer 15 at home or in office, and is converted to information of audible type.

The information providing electronic parts 11 have been described with reference to FIG. 4. In the information providing electronic parts 11, for example, there are recorded the name of the exhibited material 204; picture guidance information associated with the exhibited material 204; information on photographic conditions; voice information on artists or models or the like. The exhibited materials 204 with the information providing electronic parts are displayed in museum or in art gallery in order to provide information associated with these exhibited materials 204 to a user.

The information providing electronic parts 11 are attached to title bulletin boards 29 or the like near the exhibited materials 204 such as pictures or photographs, for example, by an information provider. Of course, the information providing electronic parts 11 may be attached to the insides of frames of the exhibited materials 204 or may be stored in a card format as an attached material in the title bulletin board 29 of the exhibited material 204. In order to emphasize the mount location (presence) of the information providing parts 11, an indication indicative of the presence is given on the surface of the title bulletin board 29.

The contents of records into the information providing electronic parts 11 in this system 600 include, for example, the price of the exhibited material 204, information associated with artist; telephone number of contact concerning the exhibited material 204 or the like. Of course, for an information user who wants to obtain more detailed information concerning the exhibited material 204, an E-mail address of the information provider as well as telephone number is recorded in the information providing electronic parts 11.

In this exhibition information providing system 600 as well, the hand held information reading display 12 described in the first embodiment is used as a hand held terminal device with its information reading function. The contents of this configuration have been described in the first embodiment, and thus, a duplicated description thereof is omitted here. In this example as well, the information reading display 12 and the information providing electronic parts 11 are coupled with each other in an at least electromagnetic manner, and exhibition information D06 is read from the information providing electronic parts 11 in an electromagnetic manner so as to be recorded in a data format.

This information reading display 12 is provided so that an information user possesses it individually. In a method for mounting the information reading display 12, as described in the first to fifth embodiments, the information reading display 12 is made close to the information providing electronic parts 11, whereby exhibition information D06 is read from the information providing electronic parts 11 in an electromagnetic manner.

As described in the first embodiment, this information reading display 12 incorporates a non-volatile memory that records exhibition information D06 or the like of the exhibited material arbitrarily read from the information providing electronic parts 11. The exhibition information D06 is not erased even if a power supply is turned OFF. In this example, the exhibition information D06 is processed by means of the information reading display 12, and is converted into information of audible type. The information obtained by processing the exhibition information D06 is displayed intact by a liquid crystal display element or the like of the information reading display 12 so that the contents can be seen or listened to immediately on the spot.

In this example as well, the USB terminal 13 of the in formation reading display 12 and a personal computer 15 at home or in office are connected to each other by using a communications cable. Then, the contents of information processed by the information reading display 12 or the exhibition information D06 that cannot be processed there are provided for communication processing. Of course, the information processed into audible type may be displayed on a CRT with which a personal computer is provided. In addition, an E-mail address of an information provider is extracted from the exhibition information D06, and connection to the information provider is made via Internet by using the personal computer 15 so that more detailed information is obtained.

Now, an example of processing in the exhibition information providing system 600 will be described here. In this example, it is presumed that the information providing electronic parts 11 are attached to the title bulletin boards 29 of all the exhibited materials 204 displayed in advance in museum or art gallery; exhibition information D06 or the like associated with the exhibited material 204 is read from the information providing electronic parts 11 in an electromagnetic manner by using a hand held information reading display 12; and the exhibition information D06 recorded in a data format is processed by the personal computer 15 at home or in office. Of course, it is presumed that each information user possesses the information reading display 12.

Figure 18:
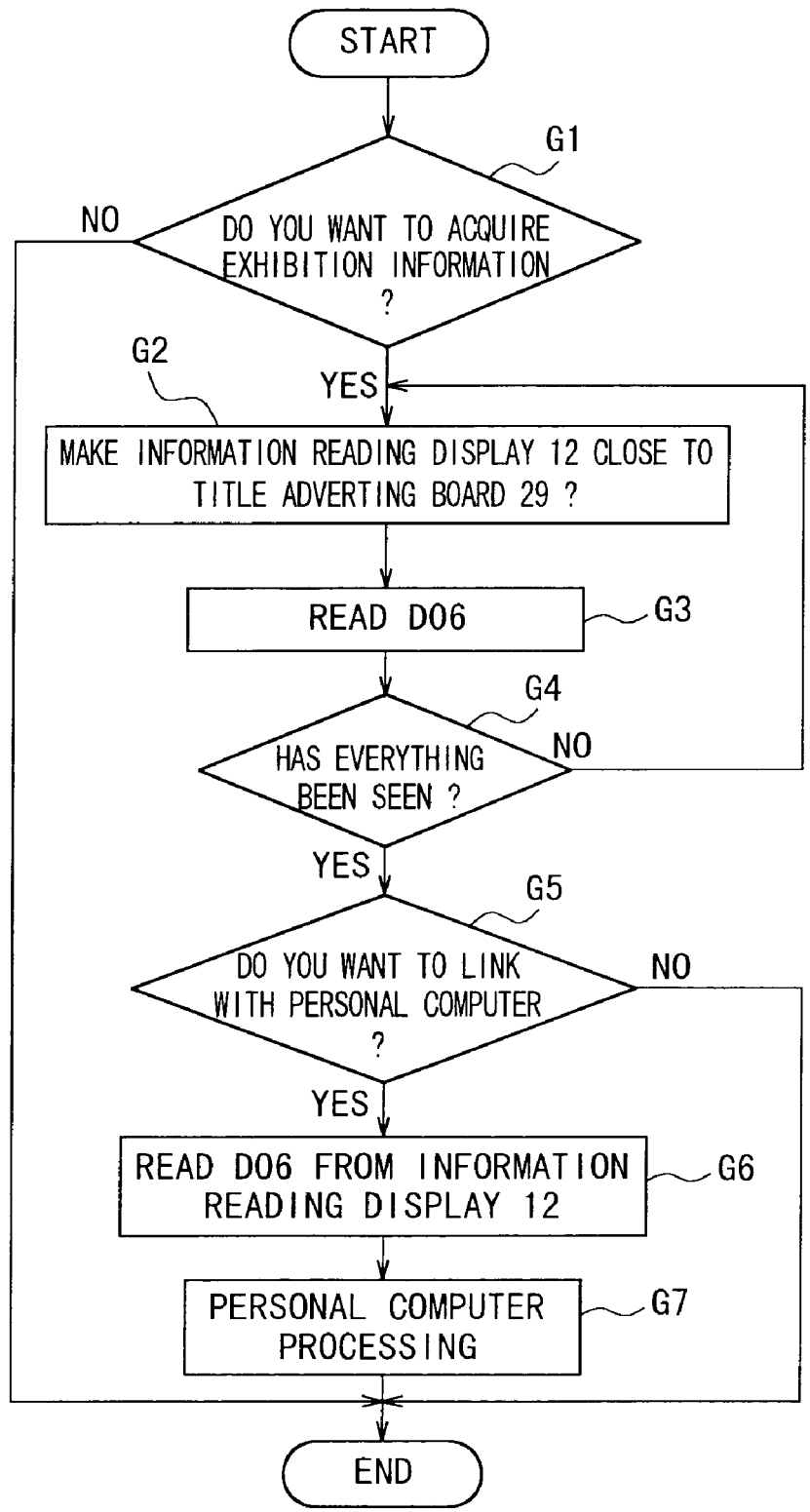
FIG. 18 is a flow chart illustrating an example of processing in the exhibition information providing system 600.

With this being presumed, at step G1 of the flow chart shown in FIG. 18, an information user determines whether or not desired information concerning an exhibited material 204 is present in museum or in art gallery. This determination is made by the information user. In the case where desired information concerning the exhibited material 204 is present, processing goes to step G2 at which the information reading display 12 is made close to the title bulletin board 29 by each exhibited material 204 corresponding to the desired information. At this time, the information reading display 12 and the information providing parts 11 are coupled with each other in an electromagnetic manner.

Then, processing goes to step G3 at which the exhibition information D06 is read from the title bulletin board 29 of the exhibited material 204, and is stored in the information reading display 12. Together with this, the exhibition information D06 is processed by using the information reading display 12. The information of audible type is displayed intact on the liquid crystal display element or the like so that the contents are seen or listened to immediately on the spot. An automatic guiding function in museum or art gallery can be used in this information reading display 12.

Then, processing goes to step G4 at which it is judged as to whether or not all the desired information concerning the exhibited material 204 is read. This determination is made by an information user. In the case where all the desired information concerning the exhibited material 204 is not read, processing reverts to step C2 at which the information reading display 12 is made close to the title bulletin board 29 of the exhibited material 204 corresponding to the desired information so as to repeat processing in the same manner as the above.

In the case where all the desired information concerning the exhibited material 204 is read, processing goes to step G5 at which it is determined as to whether or not the information reading display 12 and the personal computer 15 or the like are linked with each other at home or in office. This determination is made by an information user.

In the case where this information reading display 12 and the personal computer 15 or the like are linked with each other, processing goes to step G6 at which the USB terminal 13 of the information reading display 12 and the personal computer 15 are connected to each other by using a communications cable, and the contents of information processed by the information reading display 12 or the exhibition information D06 that cannot be processed there is read by the personal computer 15. At the personal computer 15, the information processed in audible type at step G7, for example, a profile video of an artist of the exhibited material 204 is displayed on the provided CRT. In addition, an E-mail address of an information provider is extracted from the exhibition information D06 so that more detailed information is obtained from the information provider via Internet.

In this manner, according to the exhibition information providing system 600 of the sixth embodiment, the exhibition information D06 is read from the information providing electronic parts 11 attached to the exhibited material 204 by means of the information reading display 12 brought into museum or art gallery, and the exhibition information D06 can be checked by the personal computer 15 at home.

Moreover, in the case where a purchaser wants to purchase the exhibited material 204, the purchaser directly inquires the owner of the copyright from the exhibition information D06 of the exhibited material 204 by combining the second embodiment so that the information such as purchasing method can be obtained. The exhibited material 204 may be a copyright material such as sword, sculpture, or ceramic art without being limited to picture or photograph. The information providing electronic parts 11 are attached to the title bulletin board 29 such as these copyright materials; and the information associated with the price or artist of the copyright material or telephone number of contact concerning the copyright material or the like is recorded so that these items of information can be easily obtained.

(8) Seventh Embodiment

Figure 19:
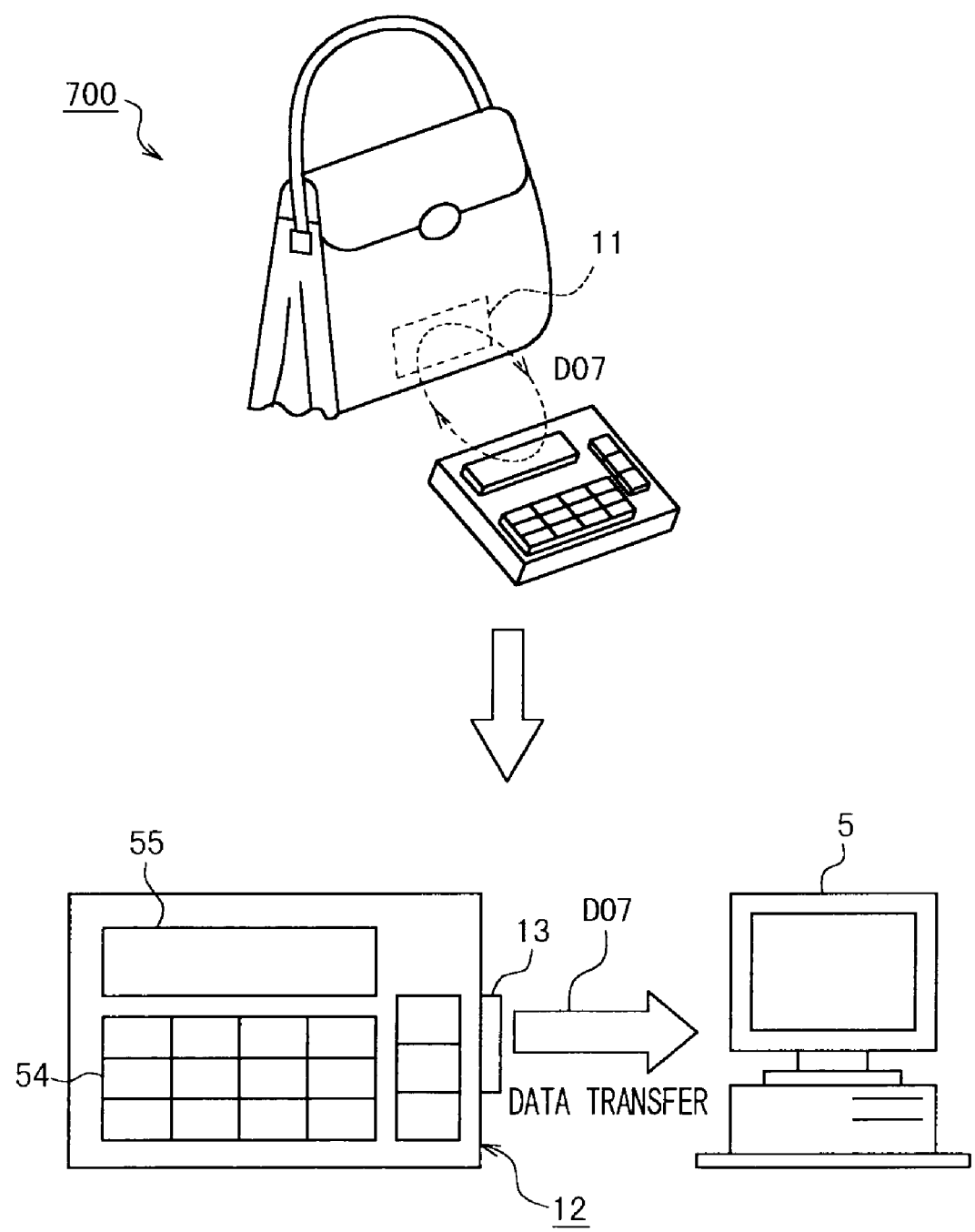
FIG. 19 is an imaginary view showing an example of configuring a commodity genuineness or counterfeit discriminating system 700 according to a seventh embodiment.

FIG. 19 is an imaginary view showing an example of configuring a commodity genuineness or counterfeit discriminating system 700 according to a seventh embodiment.

In this exemplified system, information providing electronic parts 11 are attached to prominent commodities concerning an entity 2; and item information is recorded in the information providing electronic parts 11. When the genuineness or counterfeit of the commodity must be discriminated, item information is read by the information reading display 12 from the information providing electronic parts 11 attached to the commodity. Then, the item information is fetched from the information reading display 12 to a personal computer of an governmental authority so as to discriminate the genuineness or counterfeit of the commodity. The item information includes the name of the commodity; manufacturer associated with the commodity; manufacturer specific code information; manufacturing information; quality inspection information or the like.

In the commodity genuineness or counterfeit discriminating system 700 shown in FIG. 19, the information providing electronic parts 11 described in the first embodiment are attached to prominent commodities such as bag, luggage, shoes or the like. When the genuineness or counterfeit of the commodity must be discriminated, item information D07 associated with the prominent commodity 205 is read from the information providing electronic parts 11 in an electromagnetic manner by using an information reading display 12 so that the item information D07 recorded in a data format can be discriminated by a personal computer 5 such as governmental authority.

The information providing electronic parts 11 have been described with reference to FIG. 4. In the information providing electronic parts 11, there are recorded, for example, the name and manufacture of the prominent commodity 205, manufacturer, manufacturing information, quality inspection information, origin or the like. The information providing electronic parts 11 are mounted or sewn to hand bag, luggage, shoes or the like by a commodity manufacturer. In order to prevent illegality, the information providing electronic parts 11 may be sewn to the inside of the commodity so as to be easily seen from the outside thereof.

At this time, although the information providing electronic parts 11 having item information D07 recorded therein may be built in genuineness from the beginning, the information providing electronic parts 11 having nothing recorded therein are built in genuineness, and then, item information D07 may be recorded by using a specific information recording device at the time of shipment.

In addition, although the information providing electronic parts 11 are generally created in a rectangular shape, these electronic parts may be formed in an optimal shape coincident with an mount region site without being limited thereto. The information providing electronic parts 11 is composed of an IC chip 16 and an antenna body 17 as shown in FIG. 4, and this antenna body 17 may be formed in a circular shape, an elliptical shape, or a gourd shape. The antenna body 17 can be freely deformed. The prominent commodities 205 with the information providing electronic parts are distributed in Japan, is exported outside Japan, or is imported to Japan.

The contents of records into the information providing electronic parts 11 in this system 700 include, for example, the aforementioned contents; the price of the commodity 205; telephone number of contact concerning the commodity 205 or the like. Of course, for an information user who wants to obtain more detailed information concerning the commodity 205, an E-mail address of a commodity manufacturer as well as telephone number is recorded in the information providing electronic parts 11.

In this commodity genuineness or counterfeit discriminating system 700 as well, the information reading display 12 described in the first embodiment is used as a hand held terminal device with its information read function. The contents of this configure has been described in the first embodiment, and thus, a duplicate description thereof is omitted. In this example as well, the information reading display 12 and the information providing electronic parts 11 are coupled with each other in an at least electromagnetic manner, and item information D07 is read from the information providing electronic parts 11 to the information reading display 12 in an electromagnetic manner so as to be recorded in a data format.

This information reading display 12 is provided so as to be possessed by associated authorities such as custom. In a method for handing the information reading display 12, as described in the first to sixth embodiments, the information reading display 12 is made close to the information providing electronic parts 11, whereby item information D07 is read from the information providing electronic parts 11 in an electromagnetic manner. As described in the first embodiment, the information reading display 12 incorporates a non-volatile memory, and the item information D07 or the like of the commodity 205 arbitrary read from the information providing electronic parts 11 are recorded. This item information D07 is not erased from a memory even if a power supply is turned OFF.

In this example, the USB terminal 13 of the information reading display 12 and a personal computer 85 are connected to each other by using a communications cable. Then, item information D07 is transferred from the information reading display 12 to the personal computer 85, and this item information D07 is discriminated in the personal computer 85. At the personal computer 85, the item information D07 of genuineness is recorded as an expected value. At the personal computer 85, the item information D07 from the information reading display 12 and the expected value are compared with each other concerning a problematic commodity.

As the result of comparison, in the case where the item information D07 displayed on the information reading display 12 coincides with an expected value of the personal computer 85, the commodity is provided to be regarded as genuineness. In the case where the item information D07 displayed by the information reading display 12 does not coincide with the expected value of the personal computer 85, the commodity is provided to be regarded as a counterfeit brand.

In the case where they do not coincide with each other, in the case where item information D07 cannot be read from a problematic commodity, information like item information D07 can be read from the commodity, and the contents are completely different. In the case where they coincide with each other, processing goes to analysis processing. These results of discrimination are displayed on a CRT with which a personal computer is provided. Item information D07 is processed into information of audible type by means of the information reading display 12 so that the thus processed information may be displayed intact by the liquid crystal display element or the like of the information reading display 12. The contents of display can be checked immediately on the spot during export or import check.

Now, an example of processing in the commodity genuineness or counterfeit discriminating system 700 will be described here. In this example, it is presumed that information providing electronic parts 11 are attached to the prominent commodity 205; item information D07 or the like associated with the commodity 205 is read from the information providing electronic parts 11 in an electromagnetic manner by using the information read display 12; and the item information D07 recorded in a data format is discriminated by means of the personal computer 85. Of course, it is presumed that genuineness or counterfeit checker possesses the information reading display 12.

Figure 20:
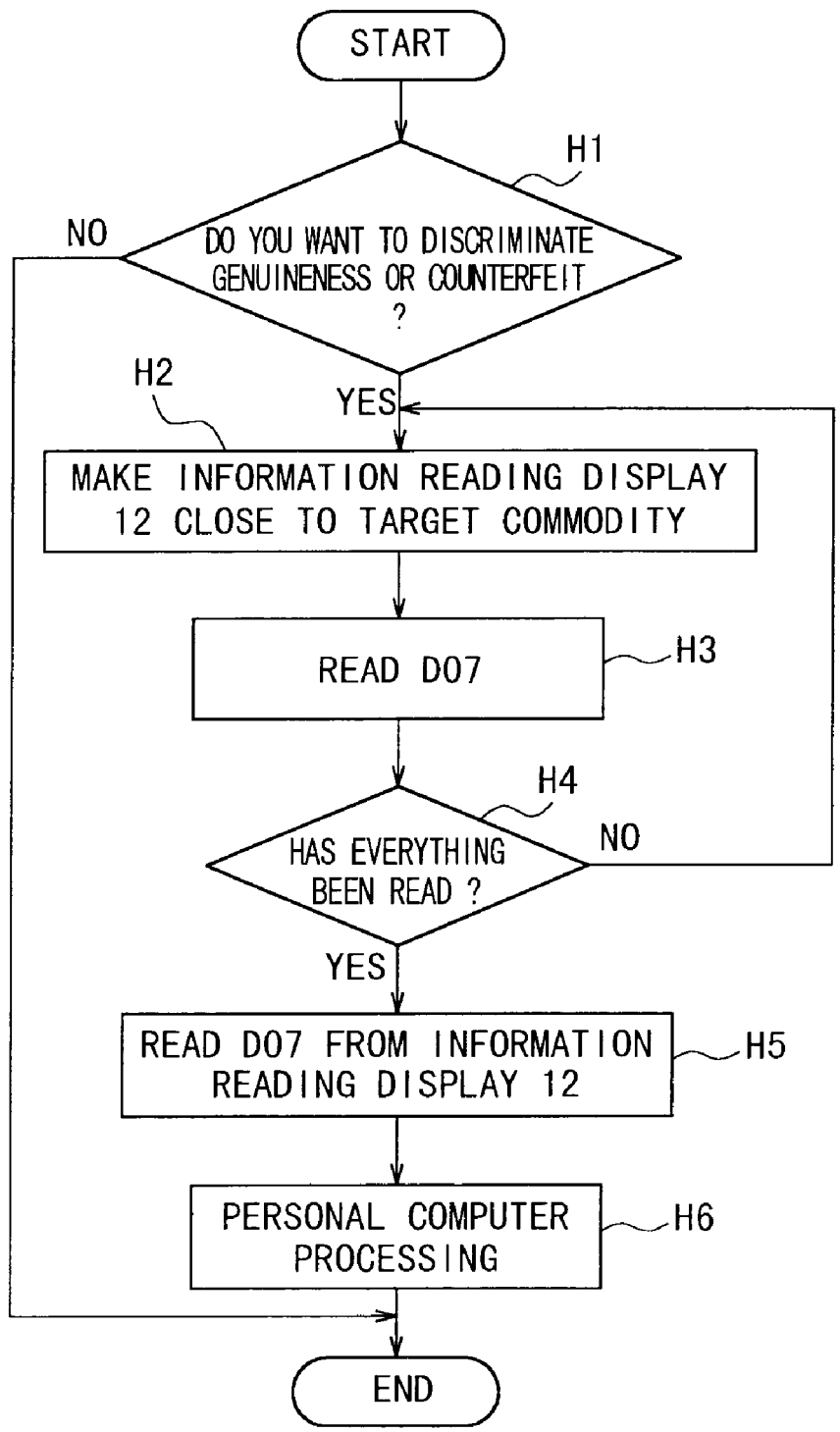
FIG. 20 is a flow chart illustrating an example of processing in the commodity genuineness or counterfeit discriminating system 700.

With this being presumed, at step H1 of the flow chart shown in FIG. 20, when an governmental authority obtains information that a commodity imported from a country that is not all origin, for example, is suspected to be counterfeit, it is determined as to whether the commodity is genuine or counterfeit. This determination is made by the associated authority such as custom. In the case where it is determined that the genuineness or counterfeit must be discriminated, processing goes to step 112 at which information reading display 12 is made close to each of all the targeted export commodities (hereinafter, referred to as a target commodity). At this time, if the target commodity is genuineness (prominent commodity) 205, the information reading display 12 and the information providing electronic parts 11 are coupled with each other in an electromagnetic manner.

Then, processing goes to step H3 at which item information D07 is read from the information providing electronic parts 11 of the prominent commodity 205, and is stored in the information reading display 12. At this time, item information D07 is discriminated by utilizing a display function of the information reading display 12, and the information of audible type or the like is displayed on a liquid crystal display element or the like so that the contents can be seen immediately on the spot.

Then, processing goes to step H4 at which it is determined as to whether or not all the item information D07 concerning a target commodity is read. This determination is made by genuineness or counterfeit checker. In the case where all the item information D07 concerning a target commodity is not read, processing goes to step H2 at which the information reading display 12 of the commodity 205 of item information D07 is made close to the commodity so that processing is repeated in the same manner as the above.

In the case where all the item information D07 of these target commodities is read, processing goes to step H5 at which the USB terminal 13 of the information reading display 12 and the personal computer 85 are connected to each other by using a communications cable, and the contents of information processed by the information reading display 12 or item information D07 that cannot be processed there are read on the personal computer 85. At step H6, the item information D07 from the information reading display 12 concerning a target commodity is compared with an expected value by means of the personal computer 85.

As the result of comparison, in the case where the item information D07 displayed by the information reading display 12 coincides with an expected value of the personal computer 85, the commodity is regarded as genuineness. In the case where the item information D07 displayed by the information reading display 12 does not coincide with an expected value of the personal computer 85, the commodity is regarded as counterfeit brand. In the case of partial coincidence, manufacturer specific encode information may differ, and thus, processing goes to analysis processing. These discrimination results are displayed on a CRT with which the personal computer is provided.

In this manner, according to a commodity genuineness or counterfeit discriminating system 700 of the seventh embodiment, item information D07 is read from the information providing electronic parts 11 attached to the prominent commodity 205 to the information reading display 12 so that the item information D07 can be discriminated by the personal computer 85 at the governmental authority.

Therefore, distribution of counterfeit brand can be prevented immediately before such brand is imported. As a result, genuineness can be protected and guaranteed. The crackdown of counterfeit can be facilitated by the information providing electronic parts 11, and customer management based on the information providing electronic parts 11 or history management of genuineness can be performed. The information providing electronic parts 11 can be used in the same way as the written warrant of the prominent commodity.

In this example, although a hand held information reading display 12 is exemplified, a specific stationary counterfeit discriminating device having its information read function and data processing function of the personal computer 85 can be configured. Item information D07 may contain a serial number, shop information or the like without being limited to the name of the commodity, encode information, manufacturer, manufacturing information, quality inspection information or the like.

(9) Eighth Embodiment

Figure 21:
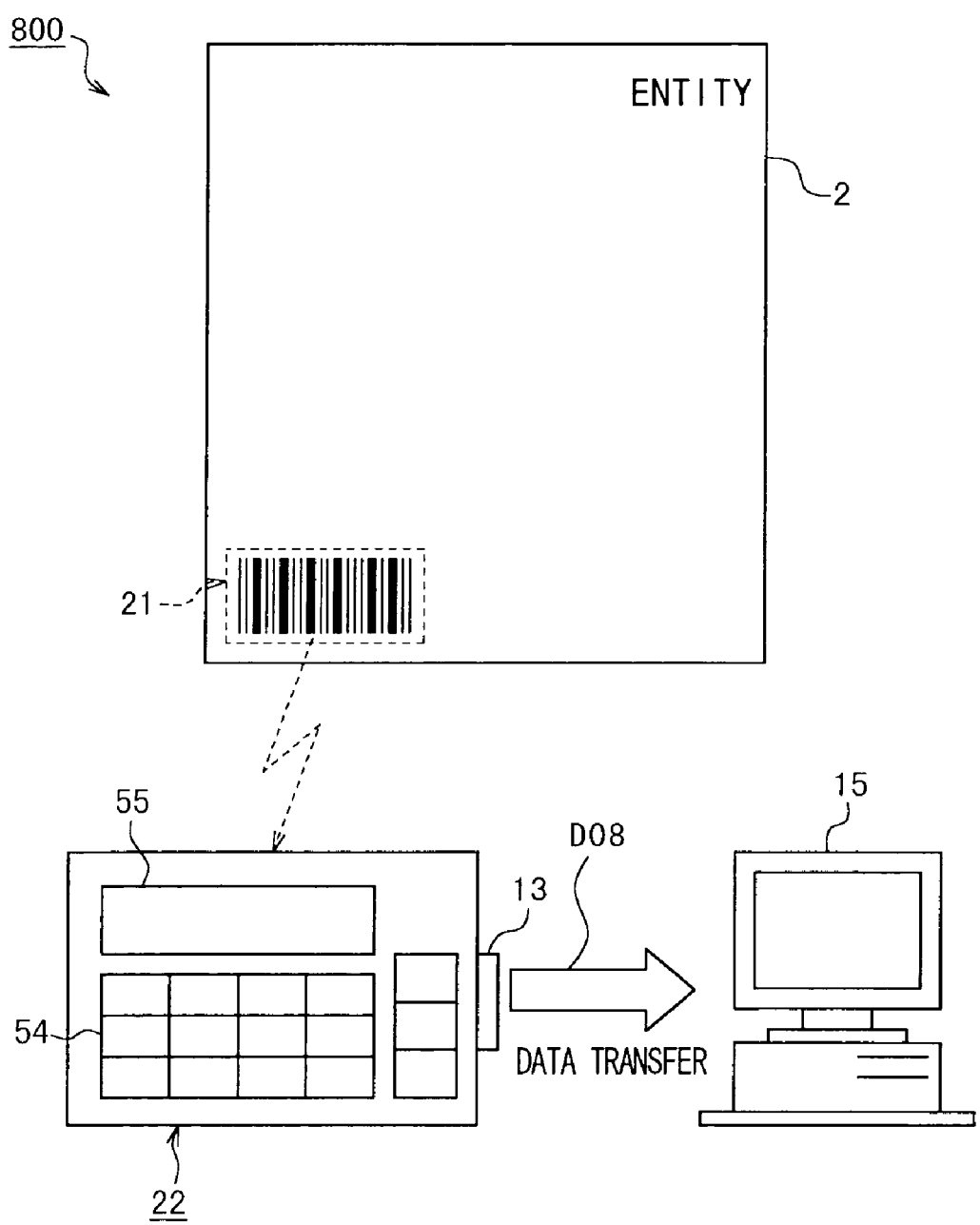
FIG. 21 is an imaginary view showing an example of configuring an information processing system 800 according to an eighth embodiment.

FIG. 21 is an imaginary view showing an example of configuring an information processing system 800 according to an eighth embodiment.

In this information processing system 800, a monochrome bar code 21 is provided as an information providing medium 1 at an arbitrary entity 2 so that information D08 associated with the entity 2 is provided in an optical manner. Like elements denoted by like reference numbers in the first embodiment have the same functions, and thus, a description thereof is omitted. In the information processing system 800 shown in FIG. 21, a monochrome bar code 21 is provided as an information providing medium 1 capable of reading information in an optical manner. This bar code 21 is provided at an arbitrary entity 2 by the information provider. For example, a monochrome bar code 21 is attached to an arbitrary advertising material (hereinafter, referred to as "entity") attached to station concourse, in train, at cinema, on street bulletin board or the like.

In this example, the bar code 21 is attached to the surface of the entity 2. Of course, in order to emphasize the mount location (presence) of the bar code 21, that portion may be emphasized. In the case where the entity 2 is provided as a commodity #i without being limited to the above pasting method, the bar code 21 may be printed in that package or the like simultaneously.

Although the information D0S associated with the entity 2 is stored as the contents of records into this bar code 21, a small amount of information is provided in comparison with the first to seventh embodiments. For example, in the case where the entity 2 is associated with an event, such event is given on the surface of the entity 2. Information D08 such as contact or E-mail address is recorded in the bar code 21 containing date and time, site, admission, traffic, contact or the like.

In this information processing system 800, a hand held optical information reading display 22 is used, and information is read from at least the bar code 21 in an optical manner, and is recorded in a data format. This information reading display 22 is provided so that an information user possesses it individually. In this example, the information reading display 22 is scanned on the bar code 21, whereby information D08 is read from the bar code 21 in an optical manner.

As in the first embodiment, a flash memory 42 that is shown as an example of non-volatile storage means is provided at this information reading display 22. In this memory, information arbitrary read from the bar code 21 is recorded. A USB terminal 13 is provided at this information reading display 22; the personal computer 15 is connected by using this USB terminal 13 or a communication cable (not shown), and the information D08 recorded in a data format is processed in audible type.

Figure 22:
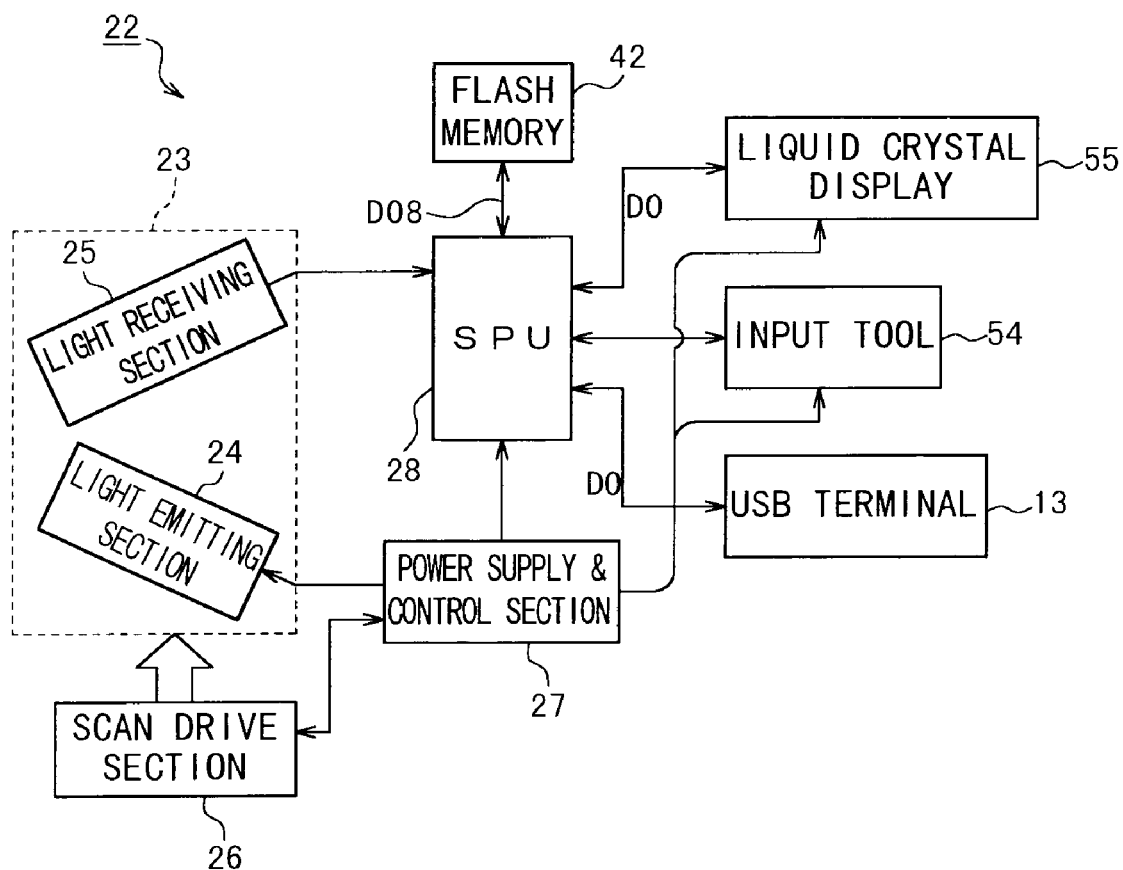
FIG. 22 is a block diagram depicting an example of configuring an optical information reading display 22.

This optical information reading display 22, for example, has a bar code reading unit 23 that is shown as an example of an optical sensor shown in FIG. 22. A light emitting section 24 is provided at the reading unit 23, and a beam-like laser light or the like is emitted. A light receiving section 25 is provided adjacent to this light emitting section 24. When the laser light is emitted to a monochrome bar code 21, for example, the reflection light reflected from that white pattern is received.

A SPU (signal processing unit) 28 is connected to this light receiving section 25, and an optical detection signal obtained by reading the monochrome bar code 21 is digitally processed. Then, information D08 such as inquiry associated with the entity 2 or E-mail address is decoded. The decoding result is stored in a RAM contained in the SPU 28 or in an external flash memory 42 and the like. With respect to this SPU 28, a CPU (central processing unit) not shown is provided. Then, information D08 is processed in audible type, and is displayed intact on a liquid crystal display 55 so that the contents can be seen on the spot.

In this example, a read unit scanning and/or driving section 26 is provided. While an information reading display 22 is made close to a bar code 21, the reading unit 23 can be scanned on the bar code 21. Of course, in the case where no space for providing the scanning and/or driving section 26 is provided because of a compacted information reading display 22, the light emitting section 24 and the light receiving section 25 are allocated and fixed in the information reading display 22 with its predetermined angle. The information reading display 22 is scanned so that the information user traces on the bar code 21 at a constant speed. In this manner, information D08 can be optically read.

A power supply & control section 27 is connected to the reading unit 23, scanning and/or driving section 26, SPU 28, input tool 54, and liquid crystal display 55, and a DC power is supplied. A dry battery or charge type battery is used for power supply.

Thus, according to the information processing system 800 of the eighth embodiment, an optically readable monochrome bar code 21 is attached to an arbitrary entity 2 by the information provider. By the information user, a hand held optical information reading display 22 is used as required, and information D08 is read from the bar code 21 in an optical manner, and is recorded. Then, information D08 read from the information reading display 22 is processed into audible type by means of the personal computer 15 or the like.

Therefore, even in the case where the entity 2 cannot be seen carefully, a small amount of information is provided. As in the first embodiment, even if information D08 such as address or contact associated with the entity 2 is not written by pen or pencil, the information D08 can be stored in the information reading display 22 momentously. Thus, one reads the information D08 from the information reading display 22 to the personal computer at home so that one can see the information D08 associated with the entity 2 or provide direct access to the company through Internet.

In addition, according to a monochrome bar code 21 of the present invention, as in the first to seventh embodiments, information D08 associated with the entity 2 can be read freely as many times as one likes by means of an optical information reading display 22. In addition, as in the first embodiment, the information D08 can be transmitted publicly as if a large amount of handbills were distributed. Moreover, as in the first embodiment, there is no need to prepare handbills in advance, and these hand bills are not disposed illegally on street, which leads to street beatification.

In this example, although a case of the monochrome bar code 21 has been described with respect to an information providing medium, such bar code may be a two-dimensional code to which a monochrome patch is applied in a checkered pattern or toothless shape.

(10) Ninth Embodiment

Figure 23:
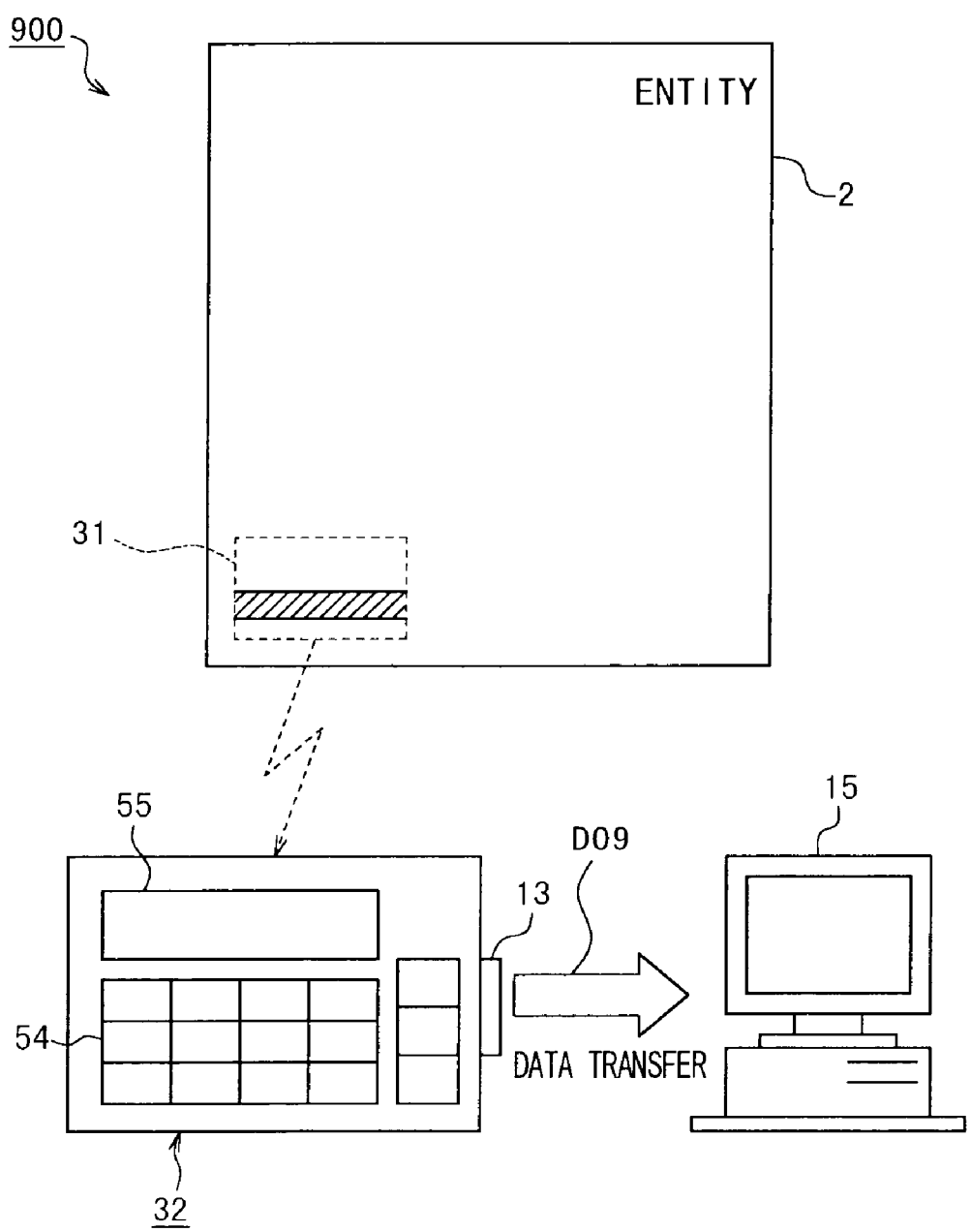
FIG. 23 is an imaginary view showing an example of configuring an information processing system 900 according to a ninth embodiment.

FIG. 23 is an imaginary view showing an example of configuring an information processing system 900 according to a ninth embodiment.

In this example, a magnetic tape 31 is provided as an information providing medium 1 at an entity 2 so that information D09 associated with the entity 2 is magnetically provided. Like elements denoted by like reference numbers in the first embodiment have their same functions, and thus, a duplicate description thereof is omitted here. At the information processing system 900 shown in FIG. 23, there is provided a sheet-like magnetic tape (magnetic information sheet) 31 capable of magnetically reading information. This magnetic tape 31 is provided at an arbitrary entity 2 by the information provider. For example, the sheet-like magnetic tape 31 is attached to an arbitrary advertising material attached at station concourse, in train, at cinema, on street bulletin board or the like. Of course, this magnetic tape 31 may be formed of a resin substrate such as magnetic card.

In this example, the magnetic tape 31 is attached to the surface of the entity 2. Of course, in order to emphasize the mount location (presence) of the magnetic tape 31, an indication to emphasize that portion may be given. As the contents of records into this magnetic tape 31, there is stored information D09 associated with the entity 2. For example, as in the first embodiment, in the case of an advertising material associated with an event, the entity 2 is given on the surface of that advertising portion. Information D09 such as date and time, site, administration, traffic, contact, or E-mail address is recorded in the magnetic tape 31.

In this information processing system 900, a hand held magnetic information reading display 32 is used, and information D09 is magnetically read from at least the magnetic tape 31, and is recorded in a data format. This information reading display 32 is provided so that an information user possesses it individually. In this example, the information reading display 32 is scanned on the magnetic tape 31, whereby information D09 is read from the magnetic tape 31.

As in the first embodiment, a flash memory 42 that is shown as an example of non-volatile storage means is provided at this information reading display 32, and information arbitrary read from the magnetic tape 31 is recorded. A USB terminal 13 is provided at this information reading display 32. A personal computer 15 is connected by using this USB terminal 13 or a communications cable (not shown), and the information D09 recorded in the data format is processed in audible type.

Figure 24:
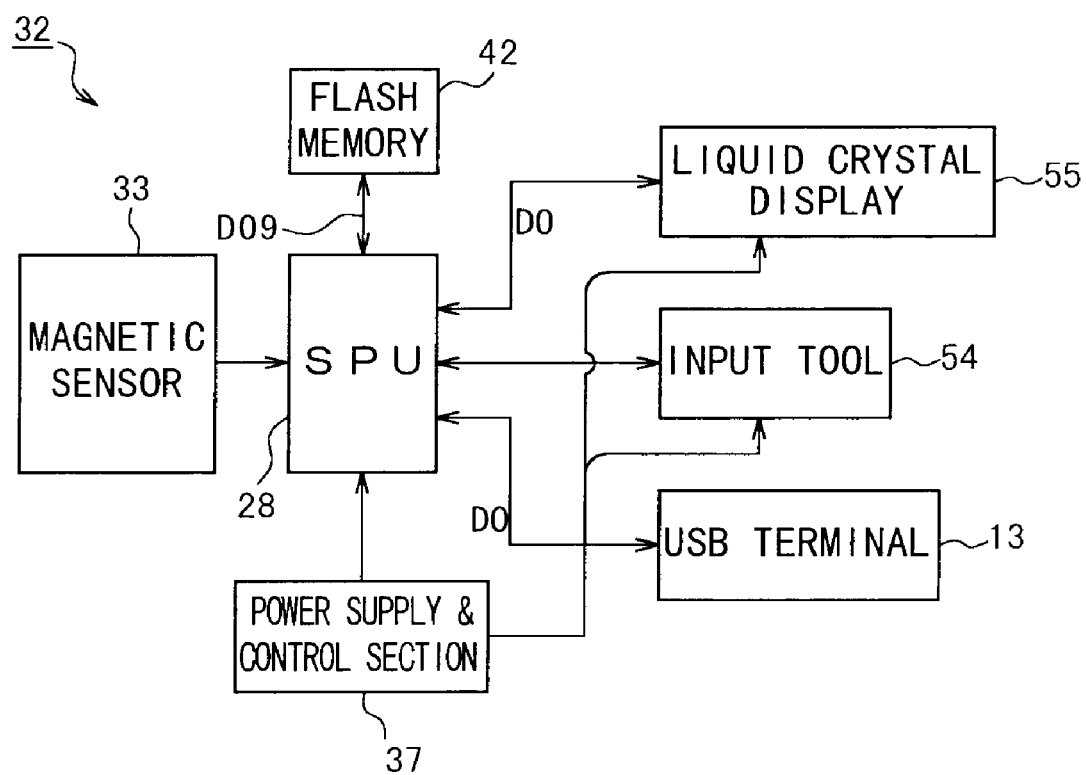
FIG. 24 is a block diagram depicting an example of configuring a magnetic information reading display 32.

This magnetic information reading display 32 has a magnetic sensor 23 shown in FIG. 24, for example. A magnetic head (not shown) is provided at a magnetic sensor 33. When the magnetic sensor 33 is scanned on a sheet-like magnetic tape 31, information D09 is reproduced from the magnetic tape 31. In this example, the information reading display 32 is scanned so that an information user traces on the magnetic tape 32 at a constant speed. In this manner, information D09 can be read magnetically.

A SPU (signal processing unit) 38 is connected to this magnetic sensor 33; a magnetic detection signal obtained by reading the magnetic tape 31 is digitally processed; and information D09 associate with the entity 2 is decoded. The decoding result is stored in a RAM contained in the SPU 38 or an external flash memory 42. With respect to this SPU 38, a CPU (central processing unit) not shown is provided; and information D09 is processed into audible type, and is displayed intact on a liquid crystal display 55 so that the contents can be seen on the spot. A power supply & control unit 37 is connected to the magnetic sensor 33, SPU 38, input tool 54, and liquid crystal display 55, and a DC power is supplied. A dry battery or charge type battery is used for power supply.

Thus, according to an information processing system 900 of a ninth embodiment, a sheet-like magnetic tape 31 capable of magnetically reading information D09 is attached to an arbitrary entity 2 by the information provider. By the information provider, information D09 is magnetically read from the magnetic tape 31 by using a hand held magnetic information reading display 32 as required, and is recorded. Then, the information D09 read from the information reading display 32 is processed into audible type by means of a personal computer 15 or the like.

Therefore, even in the case where the entity 2 cannot be seen carefully, as in the first and second embodiment, information D09 such as address or contact associated with the entity 2 can be stored in the information reading display 32 momentously without need to write the information by pen or pencil. In this manner, in the case where the information reading display 32 with its high throughput, information D09 is displayed on the liquid crystal display 55 on the spot. Even in the case of the information reading device 32 with its low throughput, a personal computer 15 is connected; and the information D09 is read from the information reading display 32 to the personal computer 15. Then, the information D09 associated with the entity 2 can be seen on a display with which a personal computer is provided or direct access to the company can be provided through Internet.

In addition, according to the magnetic tape 31 of the present invention, as in the first to eighth embodiments, information D09 associated with the entity 2 can be read freely as many times as one likes by means of a magnetic information reading display 32. Further, as in the first embodiment, the information D09 can be transmitted publicly as if a large amount of handbills were distributed. Moreover, as in the first embodiment, there is no need to prepare handbills or the like in advance, these handbills are not disposed illegally on the street, thus leading to street beautification.

(11) Tenth Embodiment

Figure 25:
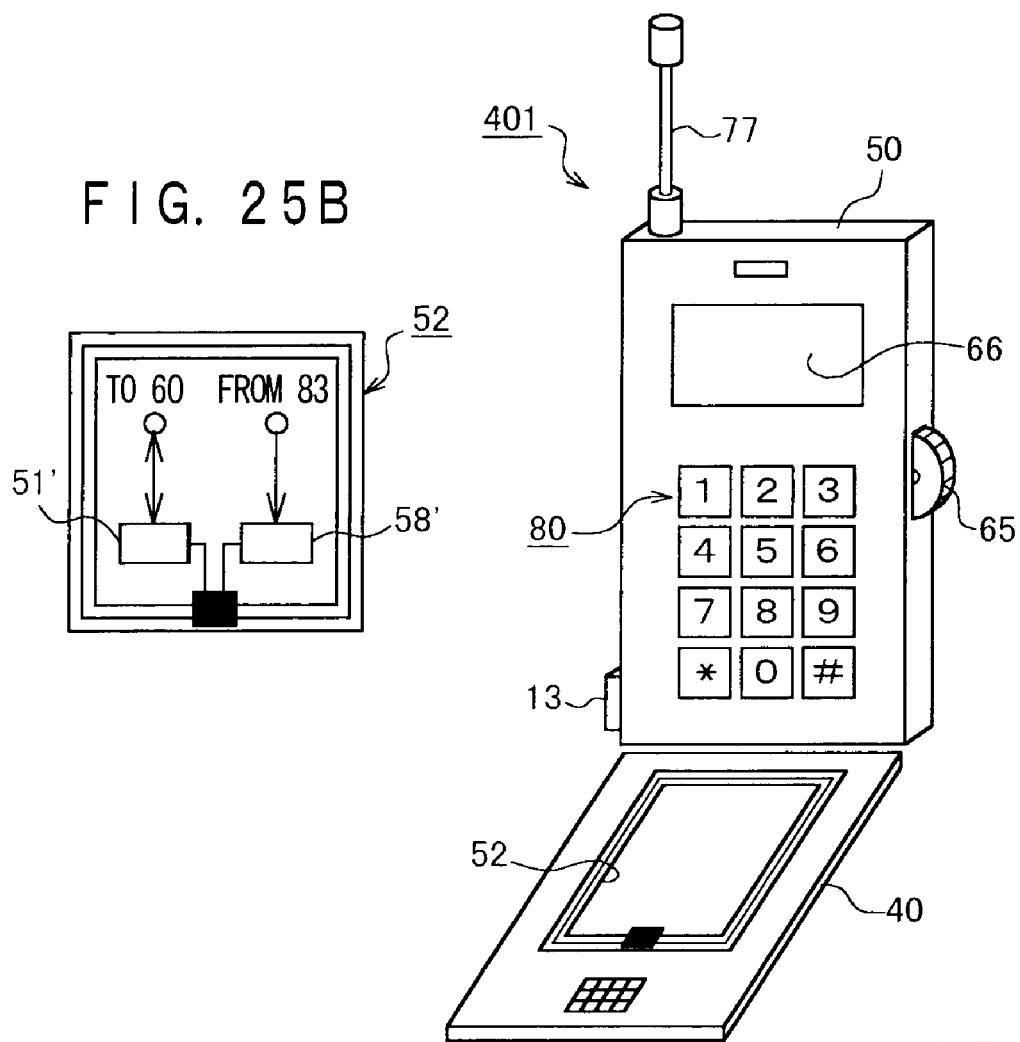
FIG. 25A is an imaginary view showing an example of the appearance of a hand held cellular phone 401 with its information reading display function according to a tenth embodiment.
FIG. 25B is an imaginary view showing an example of an internal configuration of an antenna body 52 thereof.
Figure 26:
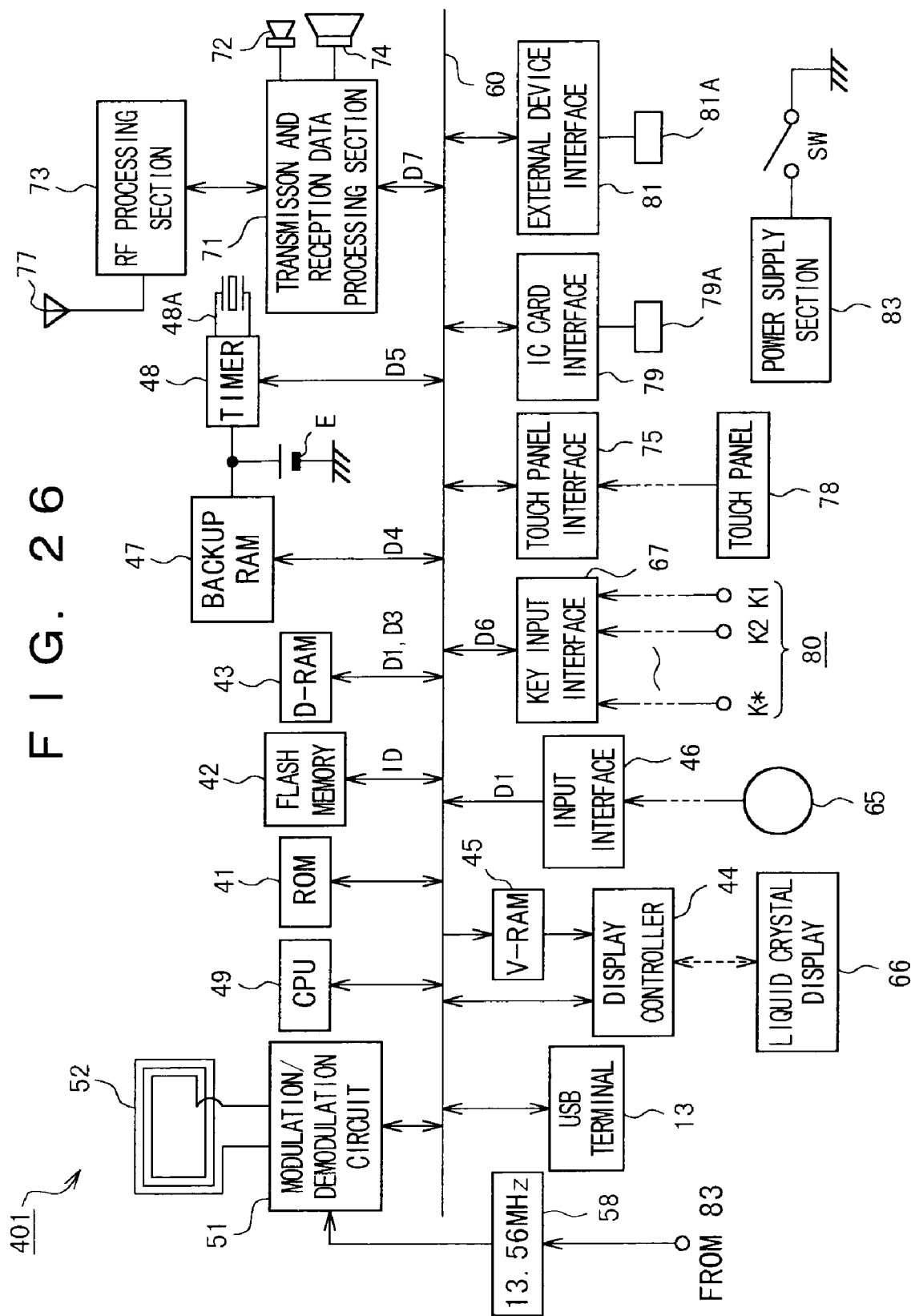
FIG. 26 is a block diagram depicting an example of an internal configuration of the hand held cellular phone.

FIG. 25A and FIG. 25B are conceptual views each showing an example of configuring a hand held cellular phone 401 with its information read function according to a tenth embodiment. FIG. 26 is a block diagram depicting an internal configuration of the cellular phone.

In this example, an information is provided at a hand held cellular phone; information associated with the entity 2 is read in an electromagnetic manner by using the information read function from the information providing medium 1 attached to an arbitrary entity 2; and the information recorded in the data format is processed in audible type so that the provided liquid crystal display element or the hand held cellular phone 401 is connected to the personal computer 15 or the like to enable information to be displayed.

The hand held cellular phone 401 shown in FIG. 25A is directed to a cellular phone that reads information from the information providing electronic parts 11 attached to an advertising material 201 as shown in FIG. 3, for example, and processes the information. A cap body 40 is engaged with the hand held cellular phone 401 so as to cover all or part of a cellular phone main body section 50. A speaker (microphone) 72 is provided at this cap body 40, and there is provided a loop shaped antenna body 52 shown in FIG. 25B, the antenna body configuring information read means; and there is provided a modulation/demodulation circuit IC51' and high frequency generating circuit IC58' so as to enable communication with the information providing electronic parts 11 attached to the entity 2 (not shown). This antenna body 52 consists of an antenna pattern by about three turns as described in the first embodiment.

The antenna body 52 of the hand held cellular phone 401 shown in FIG. 25A is coupled with an antenna body 17 of the previously described information providing electronic parts 11 shown in FIG. 4 in an electromagnetic manner, and is used in an electrically non-contact state. Ten numeric keys 80 are provided at a cellular phone main body section 50. These ten numeric keys 80 consist of a "0" key (K0) to "9" key (K9); a symbol "#" key (K#); and a "*" key (K*) to be operated by an operator.

In FIG. 26, a modulation and/or demodulation circuit 51 configuring information read means is connected to the aforementioned antenna 52. The information read means has at least the modulation/demodulation circuit 51 configuring an information read and/or write IC circuitry 51'; and an antenna body 52 so that information associated with the entity 2 is read from the information providing electronic parts 11 (not shown). For example, a modulation wave sent from the information providing electronic parts 11 is demodulated by using its demodulation function by means of the modulation/demodulation circuit 51. A data row of information associated with the entity 2 read from the information providing electronic parts 11 by the hand held cellular phone 401 is demodulated.

A high-frequency generating circuit 58 is connected to this modulation/demodulation circuit 51; and a carrier signal having its frequency of 13.56 MHz is generated. This carrier signal is utilized as an electromagnetic field energy from the modulation/demodulation circuit 51 to the information providing electronic parts 11 as described in FIG. 6. A system bus 60 is connected to this modulation/demodulation circuit 51. A CPU 49 is connected to the system bus 60; information after demodulated is displayed and controlled based on a predetermined control program; and calling and called control according to a general telephone function is performed.

A key input interface 67 is connected to this system bus 60, and a ten numeric keys 80 provided at the cellular phone main body section 50 is connected to the interface 67. A command is supplied to a CPU 49 by inputting operation using the ten numeric keys 80. For example, when a specific ten numeric key K* is pressed several times, any of an information read and display mode or a general telephone mode can be selected.

Here, an information read and display mode denotes a function for reading information by superimposing a cap body 40 of this hand held cellular phone 40 on information providing electronic parts 11; and a general telephone mode denotes a general telephone function other than information read and display mode. When the information read and display mode is set, for example, information reading is started by pressing the key K#. An end display may be made when all information has been read. After information reading has completed, an operation is made such that the telephone mode is restored by pressing the key K* once. In the telephone mode, when the ten numeric key K1, K2, . . . K0 is operated, the key data D1 associated with the counterpart telephone number can be inputted.

A jog dial 65 is provided at this hand held cellular phone 401. This jog dial 65 is connected to a system bus 60 through an input interface 46 for use in search for the counterpart telephone number and search for information read from the information providing electronic parts 11. In this example, when the jog dial 65 is operated, display command data D6 is generated.

A display controller 44 and a video RAM 45 are connected to this system bus 60, and a liquid crystal display 66 with some tens×some hundreds of pixels is connected to this display controller 44. Demodulated information output from the modulation/demodulation circuit 51, key data D1 output from a key input interface 67, and display content data D2 are temporarily stored in this video RAM 45.

The display controller 44 reads information from video RAM 45; key data D1; and display content data D2, and the liquid crystal display 66 is controlled to be displayed based on these items of information or data. For example, in the case of vertically searching a list of information read from the information providing electronic parts 11 on the display screen of the liquid crystal display 66 or a list of the counterpart telephone numbers, a liquid crystal display 66 is controlled to be displayed by means of the display controller 44 so that these lists are moved from downward to upward on the display screen based on display command data D6 generated by operation of the jog dial 65.

In this example, the display is controlled to be displayed so that the display contents on the display screen moves in a direction in which the jog dial 65 is rotated. Information read from the information providing electronic parts 11 can be checked by being displayed on the liquid crystal display 65.

In addition, a ROM 41 is connected to the system bus 60, and a control program for controlling a telephone mode and an information read and display mode or the like is stored. A flash memory 42 that is shown as an example of non-volatile storage means is connected to the system bus 60 so as to store the information read by information read means. Further, the user telephone number (ID number) or the like is recorded at a local station. A working DRAM 43 is connected to this system bus 60; and there is temporarily recorded demodulated information, key data D1, Internet information D3, or display command data D6 for commanding the contents of the display screen to be commanded.

A backup RAM (non-volatile memory) 47 is connected to the system bus 60. A backup battery E is connected to a backup RAM 47. A quartz crystal oscillating element 48A is connected to a timer 48 that shares the backup RAM 47 and the backup battery E, and time data D5 such as year or date and time is output.

In addition, a transmission and reception information processing section 71 is connected to the system bus 60. A microphone 72 that is a speaker is connected to the transmission and reception information processing section 71; and a user's voice is recorded based on the transmission and reception processing data D7 from the CPU 49. Then, amplification processing or the like is performed by the transmission and reception information processing section 71, and the amplified data is output to an RF processing section 73. At the RF processing section 73, the user's voice is converted into a radio frequency signal, and a radio electric wave is irradiated from an antenna 77.

The counterpart radio electric wave received at this antenna 77 is demodulated into a voice frequency signal by means of the RF processing section 73, and then, amplification processing or the like is performed by the transmission and reception information processing section 71, and the amplified data is output to a speaker 74 that is a cellular phone receiver. In this manner, the user can communicate with the counterpart.

In addition, a touch panel interface 75 may be provided at the system bus 60 to ensure pen input. In this case, a touch panel 78 needs to be on the screen of the liquid crystal display 66. Further, in this example, the external device USB terminal 13, IC card interfaces 79 each having sockets 79A and 81A, and external device interface 81 are connected to the system bus 60 so that information processing using the external personal computer, external IC card, and communications modem can be expanded.

Of course, a power supply section 83 is connected to these function processing circuits, and an operation for connection to the counterpart telephone line is performed after a power switch SW has been turned ON. Even if the power switch SW is not turned ON, the buzzer from the counterpart is sounded by the backup battery E.

Now, a description will be given to an example of processing in a hand held cellular phone 401 with its information read function according to a tenth embodiment.

In this example, it is presumed that at this hand held cellular phone there are provided at least a modulation/demodulation circuit 51, an antenna body 52, a high-frequency wave generating circuit 58, and a USB terminal 13 which achieve an information read function; from information providing electronic parts 11 attached to an arbitrary entity 2, the information associated with the entity 2 is read in an electromagnetic manner by using the information read function; and then, the information recorded in a data format is processed into audible type inside of the hand held cellular phone or is processed by the external personal computer 15 or the like.

With this being presumed, in the case where information is read from the information providing electronic parts 11 of the entity 2 shown in FIG. 1, a cap body 40 is first opened from the cellular phone main body section 50. Then, an information read and display mode is set by pressing a specific key K* or the like several times. In this manner, a control program associated with the information read and display mode is read from ROM 41 to CPU 49, and the mode is executed. Thereafter, the cap body 40 of the hand held cellular phone 401 is made close to information providing electronic parts 11 to be superimposed with each other. At this time, there is no need for both of them to be brought into contact with each other. Depending on the strength of electromagnetic field energy, they are made close to each other within the range of 10 cm, for example, whereby they are coupled with each other in an electromagnetic manner.

In this state, when a key K# is pressed, information reading is started. In a hand held cellular phone, a carrier signal of 13.65 MHz is generated by means of a high-frequency generating circuit, and is output to an antenna body 52 through a modulation/demodulation circuit 51. This carrier signal is used to be demodulated by means of a modulation/demodulation circuit 51, and is used as a power supply to information providing electronic parts 11. A modulation wave sent from the information providing electronic parts 11 activated by this power supply to the hand held cellular phone 401 is demodulated by using the demodulation function of the modulation/demodulation circuit 52. For example, a data row of information associated with the entity 2 is demodulated, the information being sent from the information providing electronic parts 11 to the hand held cellular phone 401. This information after demodulated is temporarily stored in a flash memory 42, DRAM 47 or V-RAM 45. Of course, information reading end flag is detected, and the end display may be made on the liquid crystal display 66 after all the information has been read. After information reading has been completed, an operation is made such that a telephone mode is restored by pressing a key K* once.

① When the Contents of Information is Seen on the Spot

This hand held cellular phone 401 is provided so as to enable search for the counterpart telephone number and search for information read from the information providing electronic parts 11 or the like by using a jog dial 65. Of course, information is processed into audible type by means of CPU 49 and video RAM 45. For example, after information has been converted into characters or symbols, image data is produced. Then, as in the case of search for the counterpart telephone number, the jog dial 65 is operated, and display command data D6 is output to the display controller 44 or V-RAM 45 through an input interface 46 and a system bus 60.

A liquid crystal display 66 of several tens×several hundreds of pixels is connected to this display controller 44 so that the display is controlled based on image data (information) after processed from the video RAM 45; key data D1 outputted from a key input interface 67; and the display content data D2. For example, image data caused by information read from the information providing electronic parts 11 is displayed on the display screen of the liquid crystal display 66 so that the contents can be checked on the spot.

At this time, when past information remains as update history information on lists, these information lists can be searched for by operation of the jog dial 65. In this manner, information read from the entity 2 such as advertising material attached to station concourse by using the information read and display function of the hand held cellular phone 401, and the information can be displayed on the liquid crystal display in train so that the read information can be seen carefully.

②When Information is Checked by External Information Processing Unit

For example, the hand held cellular phone 401 and personal computer 15 are connected to each other by using the USB terminal 13 and communications cable at home, and information is read from this hand held cellular phone 401. Information associated with the entity 2 is displayed on a display with which a personal computer is provided.

Therefore, information such as address or contact associated with the entity 2 can be recorded in a flash memory 42 or the like in a hand held cellular phone momentously by means of the hand held cellular phone 401 with the information read and display function without depending on the specific information reading displays 12, 22, and 32 described in the first to ninth embodiments.

Moreover, information associated with the entity 2 read from the flash memory 42 can be processed by utilizing a telephone function any time. In this manner, the information can be transferred to an acquaintance in the early stage. Even if the information is not written by pen or pencil, the information is read from the hand held cellular phone 401 to a personal computer 15 or the like in another place so that the information associated with the entity 2 can be seen on the liquid crystal display 66 or admission tickets can be reserved or purchased directly from the company being the entity 2 through Internet.

According to this hand held cellular phone 401, data format information can be acquired. Thus, the information on the entity 2 can be reviewed as many times as one likes without any visit to the advertising site of the entity 2 again. As a result, a hand held cellular phone 401 or the like with its electronic memo function can be provided.

As has been described, according to an information processing system, information is read from an information providing medium attached to an entity in an electromagnetic or optical manner by using a hand held terminal device with its information read function. Then, information associated with the entity is read from the hand held terminal device to the information processing unit, and is processed.

With this configuration, in the case where an information user attempts to acquire information associated with the entity, the information can be stored in a hand held cellular phone momentously. Then, information is read from the hand held terminal device to the information processing unit so that information associated with the entity can be subjected to display processing, genuineness or counterfeit discrimination processing, voice output processing or the like. Therefore, the information processing system can be fully applied to an electronic advertising system, a commodity genuineness or counterfeit discriminating system, a commodity business providing system or the like.

According to a hand held cellular phone of the present invention, in the case where information is read from an information providing medium attached to an entity, and is processed, there is provided non-volatile storage means, wherein information read from an information providing medium of an entity is stored.

With this configuration, information associated with an entity read from storage means can be processed by utilizing a telephone function any time.

According to an information providing method of the present invention, information can be read in an electromagnetic or optical manner, an information providing medium for providing information associated with the entity is attached to an entity; information is read from this information providing medium in an electromagnetic or optical manner, and is recorded; and then, the recorded information is read and processed.

With this configuration, in the case where an information user attempts to acquire information associated with the entity, the information can be read in an electromagnetic or optical manner momentously. Moreover, information associated with the entity can be utilized even without the information being written by pen or pencil as many time as one likes.

The present invention is very preferable by being applied to an electronic advertising system, a commodity selling system, a commodity information providing system, a food information providing system, a recording medium information providing system, an exhibition information providing system, a commodity genuineness or counterfeit discriminating system and the like.

What is claimed is:

1. A hand held terminal device comprising:
a modulation/demodulation circuit adapted to demodulate entity information from a signal, said signal being receivable from an information providing medium;
a data port adapted to interface with an external device, said entity information being transferable over said data port to said external device;
an RF processing section adapted to radiate a radio frequency transmission signal and adapted to receive a radio frequency reception signal; and a display, said entity information being viewable on said display,
wherein said modulation/demodulation circuit is adapted to generate electromagnetic field energy, an antenna body connected to said modulation/demodulation circuit being adapted to radiate said electromagnetic field energy and to receive said signal.

2. A hand held terminal device as claimed in claim 1, wherein the hand held terminal device is a hand held cellular phone.

3. A hand held terminal device as claimed in claim 1, wherein said modulation/demodulation circuit receives said signal when brought into close contact with said information providing medium.

4. A hand held terminal device as claimed in claim 1, wherein said RF processing section is connected to an antenna, said antenna being adapted to radiate and receive said radio frequency signals.

5. A hand held terminal device as claimed in claim 1, wherein data from said external device is transferable over said data port to the hand held terminal device.

6. A hand held terminal device as claimed in claim 1, wherein said data port is a universal serial bus (USB) terminal.

7. A hand held terminal device as claimed in claim 1, wherein said external device is located remotely from said information providing medium.

8. A hand held terminal device as claimed in claim 1, wherein said information providing medium is located remotely from the hand held terminal device.

9. A hand held terminal device as claimed in claim 1, wherein said external device is located remotely from the hand held terminal device.

10. A hand held terminal device as claimed in claim 1, further comprising:
a microphone, voice from said microphone being convertible into said radio frequency transmission signal.

11. A hand held terminal device as claimed in claim 1, wherein said radio frequency reception signal is convertible into received voice.

12. A hand held terminal device as claimed in claim 11, further comprising:
a speaker, said received voice being audible by said speaker.

13. A hand held terminal device as claimed in claim 12, wherein said entity information is audible by said speaker.

14. A hand held terminal device as claimed in claim 1, wherein said information providing medium attached to an entity.

15. An information processing system as claimed in claim 14, wherein said entity information is associated with said entity.

16. An information processing system as claimed in claim 15, wherein said entity is advertising material, said entity information being electronic information content associated with said advertising material.

17. An information processing system as claimed in claim 15, wherein said entity is a commodity, said entity information being electronic information content associated with said commodity.

18. An information processing system as claimed in claim 15, wherein said entity is a container for food, said entity information being electronic information content associated with said food.

19. An information processing system as claimed in claim 15, wherein said entity is a recording medium, said entity information being electronic information content associated with said recording medium.

20. A hand held terminal device comprising:
a modulation/demodulation circuit adapted to demodulate entity information from a signal, said signal being receivable from an information providing medium;
a data port adapted to interface with an external device, said entity information being transferable over said data port to said external device;
an RF processing section adapted to radiate a radio frequency transmission signal and adapted to receive a radio frequency reception signal;
a microphone, voice from said microphone being convertible into said radio frequency transmission signal, wherein said radio frequency reception signal is convertible into received voice; and
a speaker, said received voice being audible by said speaker, wherein said entity information is audible by said speaker,
wherein said modulation/demodulation circuit is adapted to generate electromagnetic field energy, an antenna body connected to said modulation/demodulation circuit being adapted to radiate said electromagnetic field energy and to receive said signal.

21. A hand held terminal device as claimed in claim 20, wherein the hand held terminal device is a hand held cellular phone.

22. A hand held terminal device as claimed in claim 20, wherein said modulation/demodulation circuit receives said signal when brought into close contact with said information providing medium.

23. A hand held terminal device as claimed in claim 20, wherein said RF processing section is connected to an antenna, said antenna being adapted to radiate and receive said radio frequency signals.

24. A hand held terminal device as claimed in claim 20, wherein data from said external device is transferable over said data port to the hand held terminal device.

25. A hand held terminal device as claimed in claim 20, wherein said data port is a universal serial bus (USB) terminal.

26. A hand held terminal device as claimed in claim 20, wherein said external device is located remotely from said information providing medium.

27. A hand held terminal device as claimed in claim 20, wherein said information providing medium is located remotely from the hand held terminal device.

28. A hand held terminal device as claimed in claim 20, wherein said external device is located remotely from the hand held terminal device.

29. A hand held terminal device as claimed in claim 20, wherein said information providing medium attached to an entity.

30. An information processing system as claimed in claim 29, wherein said entity information is associated with said entity.

31. An information processing system as claimed in claim 30, wherein said entity is advertising material, said entity information being electronic information content associated with said advertising material.

32. An information processing system as claimed in claim 30, wherein said entity is a commodity, said entity information being electronic information content associated with said commodity.

33. An information processing system as claimed in claim 30, wherein said entity is a container for food, said entity information being electronic information content associated with said food.

34. An information processing system as claimed in claim 30, wherein said entity is a recording medium, said entity information being electronic information content associated with said recording medium.

* * * * *